(12) United States Patent
Goto

(10) Patent No.: US 11,993,239 B2
(45) Date of Patent: May 28, 2024

(54) ELECTRIC BRAKE, AND CONTROL DEVICE

(71) Applicant: Hitachi Astemo, Ltd., Ibaraki (JP)

(72) Inventor: Daisuke Goto, Atsugi (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 568 days.

(21) Appl. No.: 17/276,969

(22) PCT Filed: Sep. 17, 2019

(86) PCT No.: PCT/JP2019/036305
§ 371 (c)(1),
(2) Date: Mar. 17, 2021

(87) PCT Pub. No.: WO2020/066735
PCT Pub. Date: Apr. 2, 2020

(65) Prior Publication Data
US 2022/0032886 A1 Feb. 3, 2022

(30) Foreign Application Priority Data

Sep. 26, 2018 (JP) .................................. 2018-180339

(51) Int. Cl.
*B60T 8/17* (2006.01)
*B60T 13/74* (2006.01)
(Continued)

(52) U.S. Cl.
CPC .............. *B60T 8/17* (2013.01); *B60T 13/746* (2013.01); *B60T 17/221* (2013.01); *F16D 65/18* (2013.01);
(Continued)

(58) Field of Classification Search
CPC ........ B60T 8/17; B60T 13/746; B60T 17/221; B60T 2201/12; F16D 65/18; F16D 66/00;
(Continued)

(56) References Cited

U.S. PATENT DOCUMENTS 8,556,353 B2 * 10/2013 Ishii ........................ B60T 8/267
303/186
10,166,960 B2 * 1/2019 Poertzgen ............. B60T 13/662
(Continued)

FOREIGN PATENT DOCUMENTS

FR 2989657 A1 * 10/2013 ........... F16D 65/183
JP 2003-194115 7/2003
(Continued)

OTHER PUBLICATIONS

International Search Report dated Nov. 5, 2019 in International Application No. PCT/JP2019/036305, with English Translation.
(Continued)

*Primary Examiner* — Atul Trivedi
(74) *Attorney, Agent, or Firm* — Wenderoth, Lind & Ponack, L.L.P

(57) ABSTRACT

An electric brake including: a brake mechanism configured to transmit a thrust force generated through drive of an electric motor to a piston, the piston being configured to move brake pads to be pressed against a disc rotor; a thrust force sensor configured to detect the thrust force transmitted to the piston; and an ECU for rear electric brake configured to control, based on a detection value obtained by the thrust force sensor, the drive of the electric motor in accordance with a brake command. The ECU for rear electric brake is configured to learn, as a reference point of a piston thrust force, a detection value obtained by the thrust force sensor when the electric motor is driven to move the piston in a direction for pressing the piston against the disc rotor in a range in which the brake pads are not in contact with the disc rotor.

5 Claims, 13 Drawing Sheets

(51) Int. Cl.
*B60T 17/22* (2006.01)
*F16D 55/226* (2006.01)
*F16D 65/18* (2006.01)
*F16D 65/38* (2006.01)
*F16D 66/00* (2006.01)
*F16D 121/24* (2012.01)
*F16D 125/40* (2012.01)
*F16D 125/48* (2012.01)
*F16D 125/50* (2012.01)
*F16D 127/02* (2012.01)

(52) U.S. Cl.
CPC .......... *F16D 66/00* (2013.01); *B60T 2201/12* (2013.01); *F16D 55/226* (2013.01); *F16D 2065/386* (2013.01); *F16D 2066/005* (2013.01); *F16D 2121/24* (2013.01); *F16D 2125/40* (2013.01); *F16D 2125/48* (2013.01); *F16D 2125/50* (2013.01); *F16D 2127/02* (2013.01)

(58) Field of Classification Search
CPC ............. F16D 55/226; F16D 2065/386; F16D 2066/005; F16D 2121/24; F16D 2125/40; F16D 2125/48; F16D 2125/50; F16D 2127/02
USPC ........................................................... 701/70
See application file for complete search history.

(56) References Cited

U.S. PATENT DOCUMENTS

| | | | | |
|---|---|---|---|---|
| 2004/0212249 | A1* | 10/2004 | Yamaguchi | F16D 65/18 303/122.04 |
| 2006/0118367 | A1* | 6/2006 | Arakawa | B60T 13/741 188/73.1 |
| 2006/0163939 | A1* | 7/2006 | Kuramochi | B60T 8/885 303/122.04 |
| 2008/0059023 | A1 | 3/2008 | Ueno et al. | |
| 2008/0091326 | A1* | 4/2008 | Watanabe | H05K 7/14322 303/20 |
| 2013/0112512 | A1* | 5/2013 | Miller | F16D 65/092 188/72.4 |
| 2014/0151164 | A1* | 6/2014 | Yokoyama | B60T 1/065 188/72.3 |
| 2016/0032995 | A1* | 2/2016 | Nishino | F16D 55/226 188/72.3 |
| 2016/0052496 | A1* | 2/2016 | Seto | F16D 55/225 188/72.1 |
| 2017/0276197 | A1* | 9/2017 | Yabusaki | F16D 65/183 |
| 2018/0154875 | A1* | 6/2018 | Takahashi | B60L 7/18 |
| 2018/0202504 | A1* | 7/2018 | Hara | F16D 65/183 |
| 2018/0215368 | A1* | 8/2018 | Isono | B60T 13/741 |
| 2019/0039579 | A1* | 2/2019 | Ohkubo | B60T 13/586 |
| 2019/0359195 | A1* | 11/2019 | Okada | B60T 13/741 |
| 2020/0108807 | A1* | 4/2020 | Ohkubo | F16D 65/183 |
| 2020/0156612 | A1* | 5/2020 | Ikuma | F16D 65/18 |
| 2020/0223408 | A1* | 7/2020 | Goto | B60T 13/662 |
| 2021/0162977 | A1* | 6/2021 | Ohkubo | B60T 13/746 |

FOREIGN PATENT DOCUMENTS

| | | | | |
|---|---|---|---|---|
| JP | 2005-69268 | | 3/2005 | |
| WO | WO-2020137734 | A1 * | 7/2020 | ............. B60T 13/74 |
| WO | WO-2020158587 | A1 * | 8/2020 | ............. B60T 13/74 |

OTHER PUBLICATIONS

Written Opinion of the International Searching Authority dated Nov. 5, 2019 in International Application No. PCT/JP2019/036305, With English Translation.

Extended European Search Report dated Oct. 21, 2021 in corresponding European Patent Application No. 19865599.5.

* cited by examiner

ELECTRIC BRAKE, AND CONTROL DEVICE

TECHNICAL FIELD

The present invention relates to an electric brake configured to apply a braking force to a vehicle, for example, an automobile, and a control device to be used for an electric brake.

BACKGROUND ART

An electric brake includes a brake mechanism configured to transmit a thrust force generated through drive of an electric motor to a piston configured to move brake pads to be pressed against a disc and a thrust force sensor configured to detect the thrust force applied to the piston (for example, see Patent Literature 1).

CITATION LIST

Patent Literature

PTL 1: JP 2003-194115 A

SUMMARY OF INVENTION

Technical Problem

In the electric brake described in Patent Literature 1, for example, clearances between the disc and the brake pads are reduced to zero when an accelerator pedal is released, and when a change amount in piston thrust force is switched from zero to non-zero, a change in piston thrust force is detected by the thrust force sensor, to thereby set the detection value as a thrust force zero point.

In an electric caliper that incorporates the thrust force sensor and is configured to use a sensor signal of the thrust force sensor to control the thrust force, the value (zero point) of the signal at the time when the thrust force is zero changes due to, for example, an individual difference, secular change, or temperature change of the sensor. To deal with this problem, it is required to repeatedly learn the thrust force zero point.

Meanwhile, causes for a fluctuation of the zero point of the thrust force sensor includes sliding resistances of internal machines of the electric caliper or other causes that change depending on the direction of the movement of the piston. As a result, the value of the sensor signal at the time when the piston is moved toward a direction for reducing the thrust force until the thrust force becomes zero, and a value of the sensor signal in a free-run section of the piston in which the piston is moved toward a direction for increasing the thrust force under a state in which the thrust force remains zero until the thrust force becomes non-zero are different from each other.

To deal with this problem, in the electric brake described in Patent Literature 1, the value at the time when the piston is moved toward the thrust force increasing direction is set as the zero point. As a result, the electric brake is not influenced by the fluctuation of the value of the sensor signal that depends on the moving direction of the piston. However, the braking force may be generated when the thrust force is switched to be a non-zero state. Consequently, the braking force is generated before a brake pedal is operated, and an occupant of the vehicle feels a sense of discomfort.

Solution to Problem

The present invention has an object to provide an electric brake and a control device which are capable of eliminating a fluctuation of a value of a thrust force sensor signal depending on a moving direction of a piston and learning a zero point under a state in which a thrust force is not generated.

According to one embodiment of the present invention, there is provided an electric brake including: a brake mechanism configured to transmit a thrust force generated through drive of an electric motor to a piston, the piston being configured to move brake pads to be pressed against a disc; a thrust force detection unit configured to detect the thrust force transmitted to the piston; and a control device configured to control the drive of the electric motor based on a detection value obtained by the thrust force detection unit, wherein the control device is configured to set, as a reference point of a piston thrust force, a detection value obtained by the thrust force detection unit when the electric motor is driven to move the piston toward a direction for pressing the disc in a range in which the brake pads are not in contact with the disc.

Further, according to one embodiment of the present invention, there is provided a control device, the control device being configured to: control drive of an electric motor of a brake mechanism, the brake mechanism being configured to transmit a thrust force generated through the drive of the electric motor to a piston, the piston being configured to move brake pads to be pressed against a disc based on a detection value obtained by a thrust force detection unit, the thrust force detection unit being configured to detect the thrust force transmitted to the piston; and set, as a reference point of a piston thrust force, a detection value obtained by the thrust force detection unit when the electric motor is driven to move the piston toward a direction for pressing the disc in a range in which the brake pads are not in contact with the disc.

According to one embodiment of the present invention, it is possible to eliminate the fluctuation of the value of the thrust force sensor signal depending on the moving direction of the piston and to learn the zero point under the state in which the thrust force is not generated.

DESCRIPTION OF THE EMBODIMENTS

With reference to the accompanying drawings, description is now given of an example in which electric brakes according to embodiments are applied to a four-wheeled vehicle.

Figure 1:
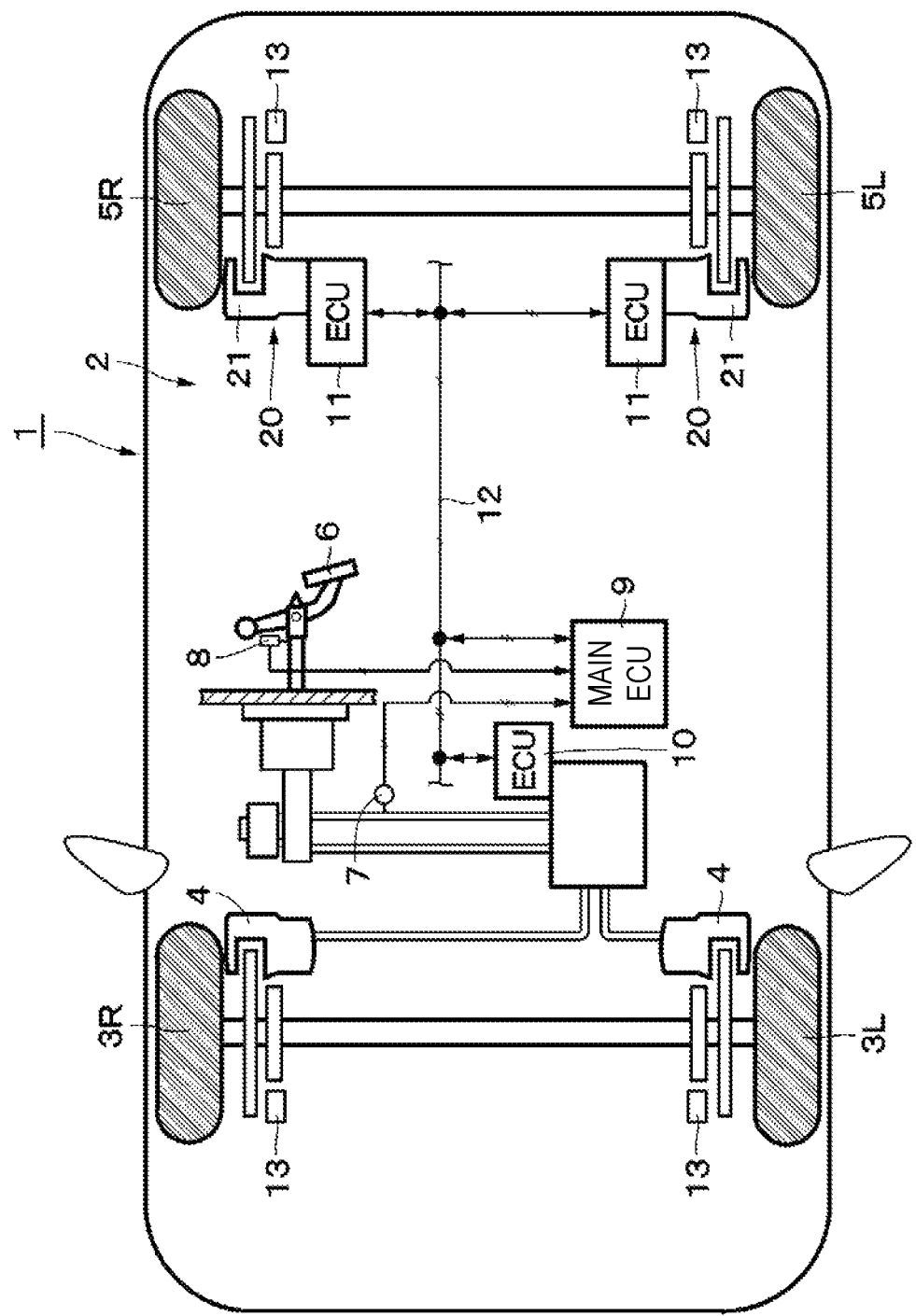
FIG. 1 is a diagram for illustrating a system configuration of a vehicle to which electric brakes according to first to third embodiments of the present invention are applied.

FIG. 1 is a diagram for illustrating a system configuration of a vehicle 1 to which electric brakes 20 according to the embodiments are applied. A brake device 2 mounted to the vehicle 1 includes hydraulic brakes 4 (front brake mechanisms) provided in correspondence to a front wheel 3L on the left side and a front wheel 3R on the right side and the electric brakes 20 (rear brake mechanisms) provided in correspondence to a rear wheel 5L on the left side and a rear wheel 5R on the right side. Moreover, a main ECU 9 is connected to a hydraulic pressure sensor 7 and a pedal stroke sensor 8 which are configured to measure an operation amount of a brake pedal 6 by a driver. The main ECU 9 receives input of signals from the hydraulic pressure sensor 7 and the pedal stroke sensor 8, and then calculates a target braking force for each of the wheels (four wheels) through a control program defined in advance. The main ECU 9 transmits, based on the calculated braking forces, a brake command directed to each of the two front wheels to an ECU 10 for front hydraulic device (that is, ESC boost ECU) via a controller area network (CAN) 12. The main ECU 9 transmits, based on each of the calculated braking forces, a brake command directed to each of the two rear wheels to each ECU 11 for rear electric brake via the CAN 12. Moreover, the main ECU 9 is connected to wheel speed sensors 13 each provided in a vicinity of each of the front wheels 3L and 3R and the rear wheels 5L and 5R, and can thus detect a wheel speed of each wheel. The ECU 11 for rear electric brake forms a control device configured to control drive of an electric motor 39 based on the brake command.

Figure 2:
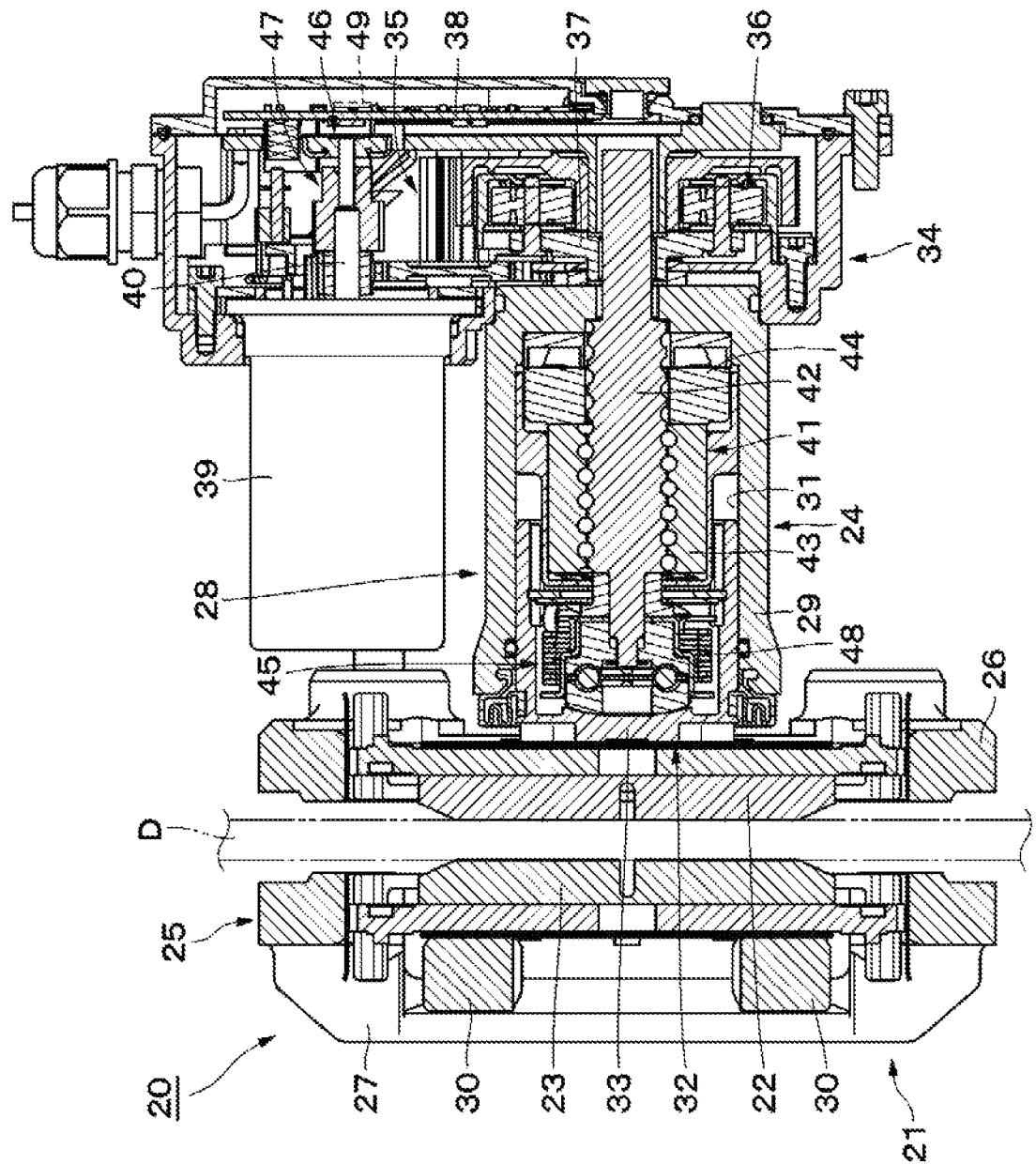
FIG. 2 is a cross-sectional view for illustrating the electric brake.

With reference to FIG. 1 and FIG. 2, description is now given of a specific configuration of the electric brake 20.

The electric brake 20 includes a brake mechanism 21, a thrust force sensor 44, a rotational angle sensor 46, and the ECU 11 for rear electric brake. The brake mechanism 21 is configured to transmit the thrust force generated through the drive of the electric motor 39 to a piston 32 configured to move brake pads 22 and 23 to be pressed against a disc rotor D (disc). The thrust force sensor 44 is configured to detect the thrust force applied to the piston 32. The rotational angle sensor 46 is configured to detect a rotational position of the electric motor 39. The ECU 11 for rear electric brake serving as a control device is configured to control the drive of the electric motor 39 based on the brake command.

As illustrated in FIG. 2, the brake mechanism 21 includes a pair of an inner brake pad 22 and an outer brake pad 23, and a caliper 24. The inner brake pad 22 and the outer brake pad 23 are arranged on both sides of the disc rotor D in an axial direction thereof. The disc rotor D is mounted to a rotating portion of the vehicle 1. The electric brake 20 is configured as a floating caliper type brake. The pair of the inner brake pad 22 and the outer brake pad 23 and the caliper 24 are supported by a bracket 25 fixed to a non-rotating portion, for example, a knuckle of the vehicle 1.

The bracket 25 includes an inner-side support portion 26 and an outer-side support portion 27 configured to independently support the inner brake pad 22 and the outer brake pad 23, respectively. The inner brake pad 22 is supported inside the inner-side support portion 26 so as to be movable along the axial direction of the disc rotor D. The outer brake pad 23 is supported inside the outer-side support portion 27 so as to be movable along the axial direction of the disc rotor D.

The caliper 24 includes a caliper main body 28 and the electric motor 39. The caliper main body 28 is a main body of the caliper 24. The electric motor 39 is arranged side by side with the caliper main body 28. In the caliper main body 28, a cylinder portion 29 and claw portions 30 are integrally formed. The cylinder portion 29 is cylindrical, and is arranged on a base end portion opposed to the inner brake pad 22 on an inner side of the vehicle and is opened so as to be opposed to the inner brake pad 22. The claw portions 30 extend from the cylinder portion 29 toward the outer side across the disc rotor D, and are then arranged on a distal end side opposed to the outer brake pad 23 on an outer side of the vehicle.

A bottomed cylinder 31 is formed in the cylinder portion 29. The piston 32 is configured to press the inner brake pad 22, and is formed into a bottomed cup shape. The piston 32 is accommodated in the cylinder 31 so that a bottom portion 33 thereof is opposed to the inner brake pad 22.

A gear housing 34 is arranged on a bottom wall side of the cylinder portion 29 of the caliper main body 28. A spur gear multistage speed reduction mechanism 35, a planetary gear speed reduction mechanism 36, and a control board 38 are accommodated inside the gear housing 34. The ECU 11 for rear electric brake serving as the control device formed of, for example, a microcomputer, is mounted on the control board 38.

The ECU 11 for rear electric brake controls the drive of the electric motor 39 based on the brake command. Moreover, the ECU 11 for rear electric brake executes programs stored in advance in a memory (not shown). The programs include a program for processing of learning a thrust force zero point illustrated in FIG. 5 and FIG. 6.

The caliper main body 28 includes the electric motor 39, the spur gear multistage speed reduction mechanism 35, the planetary gear speed reduction mechanism 36, a ball screw mechanism 41, the thrust force sensor 44, a return mechanism 45, the rotational angle sensor 46, and a thrust force holding mechanism 47. The spur gear multistage speed reduction mechanism 35 and the planetary gear speed reduction mechanism 36 are transmission mechanisms configured to increase a rotational torque transmitted from the electric motor 39. The rotation is transmitted from the spur gear multistage speed reduction mechanism 35 and the planetary gear speed reduction mechanism 36 to the ball screw mechanism 41, and the ball screw mechanism 41 then applies the thrust force to the piston 32. The thrust force sensor 44 is configured to detect a reaction force of the thrust force (pressing force). The thrust force is applied from the piston 32 to the inner brake pad 22 and the outer brake pad 23. The return mechanism 45 is configured to accumulate, when the push rod 42 of the ball screw mechanism 41 propels the piston 32, a rotational force for the push rod 42 toward the retracting direction. The rotational angle sensor 46 detects a rotational angle of a rotating shaft 40 of the electric motor 39. The thrust force holding mechanism 47 is configured to hold the thrust force applied from the piston 32 to the inner brake pad 22 and the outer brake pad 23 during the braking. The thrust force sensor 44 forms a thrust force detection unit configured to detect the thrust force applied to the piston 32. The thrust force sensor 44 is arranged so as to be sandwiched between a base nut 43 forming the ball screw mechanism 41 and a bottom portion of the cylinder 31.

The spur gear multistage speed reduction mechanism 35 and the planetary gear speed reduction mechanism 36 reduce the rotational speed and increase the rotational torque of the rotation of the electric motor 39 at a predetermined reduction ratio, and transmit the rotation to a carrier 37 of the planetary gear speed reduction mechanism 36. The rotation of the carrier 37 is transmitted to the push rod 42 of the ball screw mechanism 41.

The ball screw mechanism 41 is configured to convert the rotational motion transmitted from the spur gear multistage speed reduction mechanism 35 and the planetary gear speed reduction mechanism 36, that is, the rotational motion of the electric motor 39, to a rectilinear motion (hereinafter referred to as "linear motion" for the sake of convenience), to thereby apply the thrust force to the piston 32. The ball screw mechanism 41 is formed of the push rod 42 and the base nut 43. The rotational motion from the spur gear multistage speed reduction mechanism 35 and the planetary gear speed reduction mechanism 36 is transmitted to the push rod 42 serving as a shaft member. The base nut 43 serving as a nut member is threadedly engaged with an outer peripheral surface of the push rod 42. The base nut 43 is fitted through a fitting portion (not shown) so as not to rotate relative to the cylinder 31. The push rod 42 can advance while pressing the base nut 43 against the thrust force sensor 44 and rotating relative to the base nut 43. Further, the push rod 42 is connected to the piston 32 via a thrust bearing mounted to a distal end so as to be able to relatively rotate. As a result, the piston 32 can be advanced, and the inner brake pad 22 can consequently be pressed against the disc rotor D by the piston 32.

The return mechanism 45 is sometimes also referred to as "fail open mechanism." The return mechanism 45 includes a return spring 48. The return spring 48 is formed of a coil spring. The return spring 48 can accumulate the rotational force for the push rod 42 toward the retracting direction. The return mechanism 45 is configured to release the braking force applied by the piston 32 from the inner pad 22 and the outer part 23 to the disc rotor D when the electric motor 39, the control board 38, or the like fails during the braking.

The rotational angle sensor 46 is configured to detect the rotational angle of the rotating shaft 40 of the electric motor 39. The rotational angle sensor 46 includes a magnet member (not shown) and a magnetism-detecting IC chip (not shown). The magnet member is mounted to the rotating shaft 40 of the electric motor 39. The rotational angle of the rotating shaft 40 of the electric motor 39 can be calculated and detected by the control board 38 through detection of a change in magnetic flux generated from the rotating magnet member by the magnetism-detecting IC chip. The rotational angle sensor 46 forms a rotational position detection unit configured to detect the rotational position of the electric motor 39.

A current sensor 49 is mounted inside a motor drive circuit on the control board 38 so as to be able to detect a motor current supplied to the electric motor 39. The current sensor 49 outputs a signal corresponding to the motor current.

Description is now given of actions of the braking and release of the braking in the electric brake 20 during normal travel.

At the time of the braking during the normal travel, the electric motor 39 is driven in accordance with a command from the ECU 11 for rear electric brake. The rotation in a forward direction, that is, a braking direction (thrust force increasing direction), of the electric motor 39 is reduced in speed and increased in torque at the predetermined reduction ratio through the spur gear multistage speed reduction mechanism 35 and the planetary gear speed reduction mechanism 36, and is then transmitted to the carrier 37 of the planetary gear speed reduction mechanism 36. The rotation of the carrier 37 is transmitted to the push rod 42 of the ball screw mechanism 41.

When the push rod 42 starts rotating as the carrier 37 rotates, the push rod 42 advances while pressing the base nut 43 against the thrust force sensor 44 and rotating relative to the base nut 43. When the push rod 42 advances while rotating relative to the base nut 43, the piston 32 advances. The inner brake pad 22 is pressed against the disc rotor D by the piston 32. The caliper main body 28 is moved toward the right direction of FIG. 2 with respect to the bracket 25 by the reaction force of the pressing force applied to the inner brake pad 22 by the piston 32. The outer braked pad 23 mounted to the claw portions 30 is consequently pressed against the disc rotor D. As a result, the disc rotor D is clamped by the inner brake pad 22 and the outer brake pad 23, and a friction force is thus generated. Then, the braking force to be applied to the vehicle 1 is consequently generated.

When the disc rotor D is maintained to be clamped by the inner brake pad 22 and the outer brake pad 23, and the generation of the braking force thus starts, the reaction force thereof is applied to the thrust force sensor 44 from the inner brake pad 22 side via the push rod 42 and the base nut 43 and from the outer brake pad 23 side via the claw portions 30 and the bottom portion of the cylinder 31. The thrust force applied from the inner brake pad 22 and the outer brake pad 23 to the disc rotor D by the advancement of the piston 32 is detected by the thrust force sensor 44.

Subsequently, the rotational force for the push rod 42 toward the retracting direction is accumulated in the return spring 48. After that, the drive of the electric motor 39 is controlled in accordance with detection signals from the rotational angle sensor 46, the thrust force sensor 44, and the like, to thereby establish the braking state.

Meanwhile, at the time of the release of the braking, the rotating shaft 40 of the electric motor 39 is rotated in an opposite direction, that is, a braking release direction (thrust force reducing direction), in accordance with a command from the ECU 11 for rear electric brake. Further, the rotation in the opposite direction is transmitted to the push rod 42 via the spur gear multistage speed reduction mechanism 35 and the planetary gear speed reduction mechanism 36. As a result, the push rod 42 starts retracting while relatively rotating in the opposite direction, to thereby reduce the thrust force applied to the disc rotor D. The caliper main body 28 moves toward the left direction of FIG. 2 with respect to the bracket 25, and the piston 32 retracts by a restoring force of the inner brake pad 22 and the outer brake pad 23 compressed by the thrust force. As a result, the return spring 48 returns to an initial state, and the braking force applied to the disc rotor D by the inner brake pad 22 and the outer brake pad 23 is released.

The retraction of the piston 32 by the restoring force of the pads continues until the restoring force applied by the inner brake pad 22 and the outer brake pad 23 matches a sum of sliding resistances existing between the respective pads and the bracket and a sliding resistance existing between the piston 32 and the cylinder 31. In order to further retract the piston 32 subsequently, it is required to further drive the electric motor 39 toward the thrust force reducing direction to further retract the push rod 42, to thereby transmit the force so that the piston 32 retracts via a retaining ring. The retaining ring is fitted to a groove existing in an inner wall surface of the piston, and is configured to restrict a relative displacement amount between the piston 32 and the push rod 42 in the direction of the linear motion.

A remaining thrust force between the inner brake pad 22 and the outer brake pad 23, and the disc rotor D is generated under the state in which the inner brake pad 22 and the outer brake pad 23 do not retract any more due to the sliding resistances between the pads and the bracket and between the piston 32 and the cylinder 31. The remaining thrust force becomes a resistance torque (drag torque) when the disc rotor D rotates, and thus influences the fuel consumption of the vehicle. To deal with this problem, in the electric brake 20, when the brake command from the main ECU 9 is finished, or does not exist, a gap (clearance) is formed between the piston 32 and the inner brake pad 22 by driving the electric motor 39 toward the thrust force reducing direction so as to reduce the remaining thrust force, to thereby be able to reduce the drag torque. It is also possible to form the clearance between the disc rotor D and the inner brake pad 22 by fitting the piston 32 and the inner brake pad 22 to each other so that the piston 32 and the inner brake pad 22 integrally move linearly (not shown). It is also possible to form a clearance between the disc rotor D and the outer brake pad 23 through, for example, a method of providing, between the inner brake pad 22 and the outer brake pad 23, a spring biased toward the directions away from the disc rotor D. It is possible to further reduce the drag torque through those methods.

When the electric motor 39 or the control board 38 fails during the braking, the push rod 42 is retracted while relatively rotating in the opposite direction by the biasing force accumulated in the return spring 48 in the course of the braking, and the braking force applied from the inner brake pad 22 and the outer brake pad 23 to the disc rotor D is released.

As described above, the electric brake 20 includes the rotational angle sensor 46, the thrust force sensor 44, and the current sensor 49 in order to execute position control and thrust force control for the piston 32. The rotational angle sensor 46 can detect the rotational angle of the electric motor 39. The thrust force sensor 44 can detect the thrust force of the piston 32. The current sensor 49 can detect the motor current. Moreover, the electric brake 20 includes the return mechanism 45 (fail open mechanism) capable of releasing the thrust force in order to address a failure that occurs during the generation of the thrust force.

Figure 3:
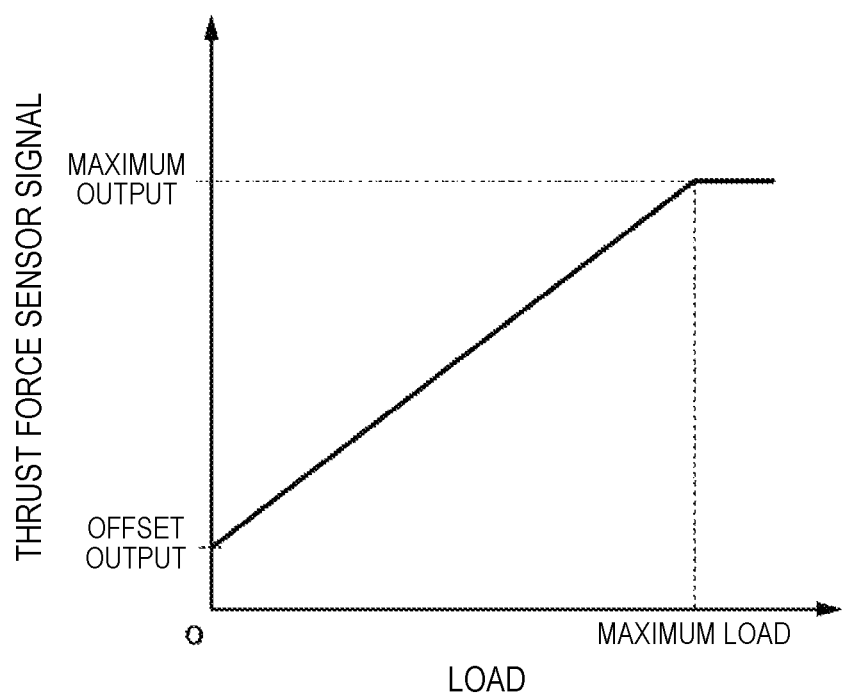
FIG. 3 is a characteristic graph for showing a relationship between a load and a thrust force sensor signal.

With reference to FIG. 3, description is now given of a relationship between a load applied to the thrust force sensor 44 configured to detect the thrust force generated by the electric brake 20 and the output signal (thrust force sensor signal) of the thrust force sensor 44. As described above, the reaction force generated by the generation of the thrust force becomes the load applied to the thrust force sensor 44. The thrust force sensor 44 outputs a value corresponding to the load as the detection signal to the ECU 11 for rear electric brake. In the present invention, any method may be used to convert the reaction force to the signal. For example, deformation inside the sensor caused by the reaction force may be detected as a change in distortion or a change in a gap between the components. Moreover, an output form of the result of the detection of the reaction force may be an analog voltage or digital communication to/from the ECU 11 for rear electric brake through use of an IC inside the sensor.

When electric power required for the thrust force sensor 44 to output the detection signal is supplied from the ECU 11 for rear electric brake, the output signal (thrust force sensor signal) of the thrust force sensor 44 is generally output so as to monotonically increase or decrease in accordance with the input in a range of a supplied voltage. In order to distinguish a case in which the signal itself is not output, a case in which the supplied voltage itself is output due to a failure, or other cases, even when input (load in the case of thrust force sensor 44) to the sensor is 0, the output signal may not be 0, but may be offset, for example, may be approximately 10% of the range of the output signal. Also on a maximum output side, the output signal may be limited to, for example, approximately 90% of the output signal range.

In those cases, the offset output obtained when the load is 0 fluctuates due to an individual difference of a constant of an internal circuit of the sensor, a temperature change, a secular change, and the like. To deal with this problem, the clearance is secured between the inner brake pad 22 and the piston 32 in the above-mentioned non-braking state, and the value of the offset output under a state in which the thrust force is not generated is learned as the value at the time when the thrust force is zero. After that, a change from the value at the time when the thrust force is zero is recognized as the generated thrust force, to thereby control the thrust force. With this configuration, the precision of the thrust force control can be increased.

However, when the generated thrust force is released, and the piston 32 is retracted until the clearance is secured, after the retraction of the piston 32 by the restoring force of the pad is stopped by the sliding resistances, and before the push rod 42 retracts the piston 32 via the retaining ring, the base nut 43 inversely rotates by an amount of a backlash between threaded engagement surfaces of the push rod 42 and the base nut 43, that is, a contact surface for transmitting the force for the linear motion inversely rotates, and a force is applied toward the direction that spaces the base nut 43 apart from the sensor 44. As a result, the load applied to the thrust force sensor 44 decreases.

When the piston 32 advances from this state to achieve the brake command issued from the main ECU 9, after the push rod 42 presses the base nut 43 against the thrust force sensor 44, and there is generated the force that is formed by the sliding resistance existing between the piston 32 and the cylinder 31 and the like and is equal to or larger than the force required to advance the piston 32, the piston 32 advances as described above. As a result, the load applied to the thrust force sensor 44 increases before the thrust force is actually generated. When the output signal of the thrust force sensor 44 is learned as the value at which the thrust force is zero after the clearance is secured, a difference due to the load applied to the thrust force sensor 44 by the backlash of the ball screw mechanism 41, the sliding resistances, and the like becomes an error in thrust force, and the precision of the thrust force control deteriorates.

Figure 4:
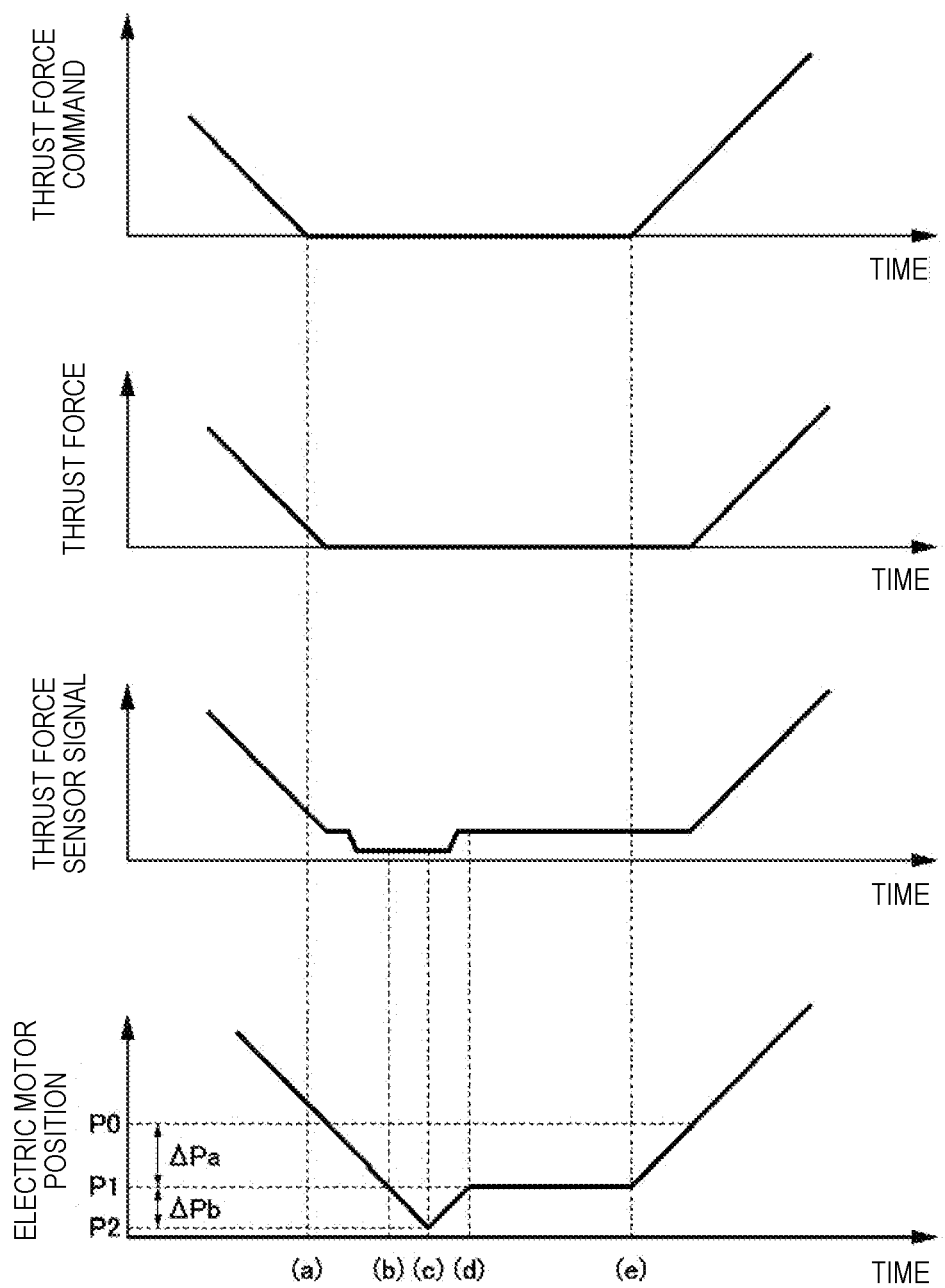
FIG. 4 shows characteristic graphs for showing an example of temporal changes in thrust force command, thrust force, thrust force sensor signal, and electric motor position in the first embodiment.
Figure 5:
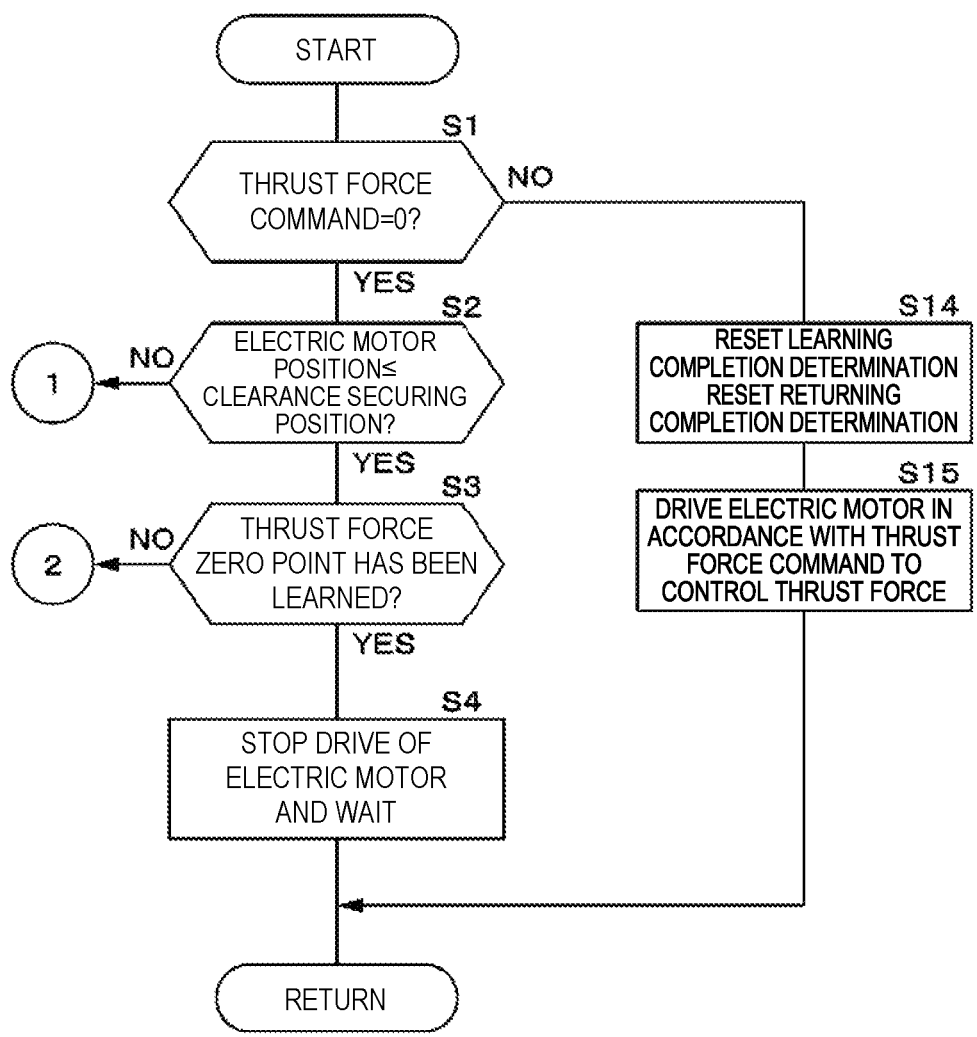
FIG. 5 is a flowchart for illustrating processing for learning a thrust force zero point in the first embodiment.
Figure 6:
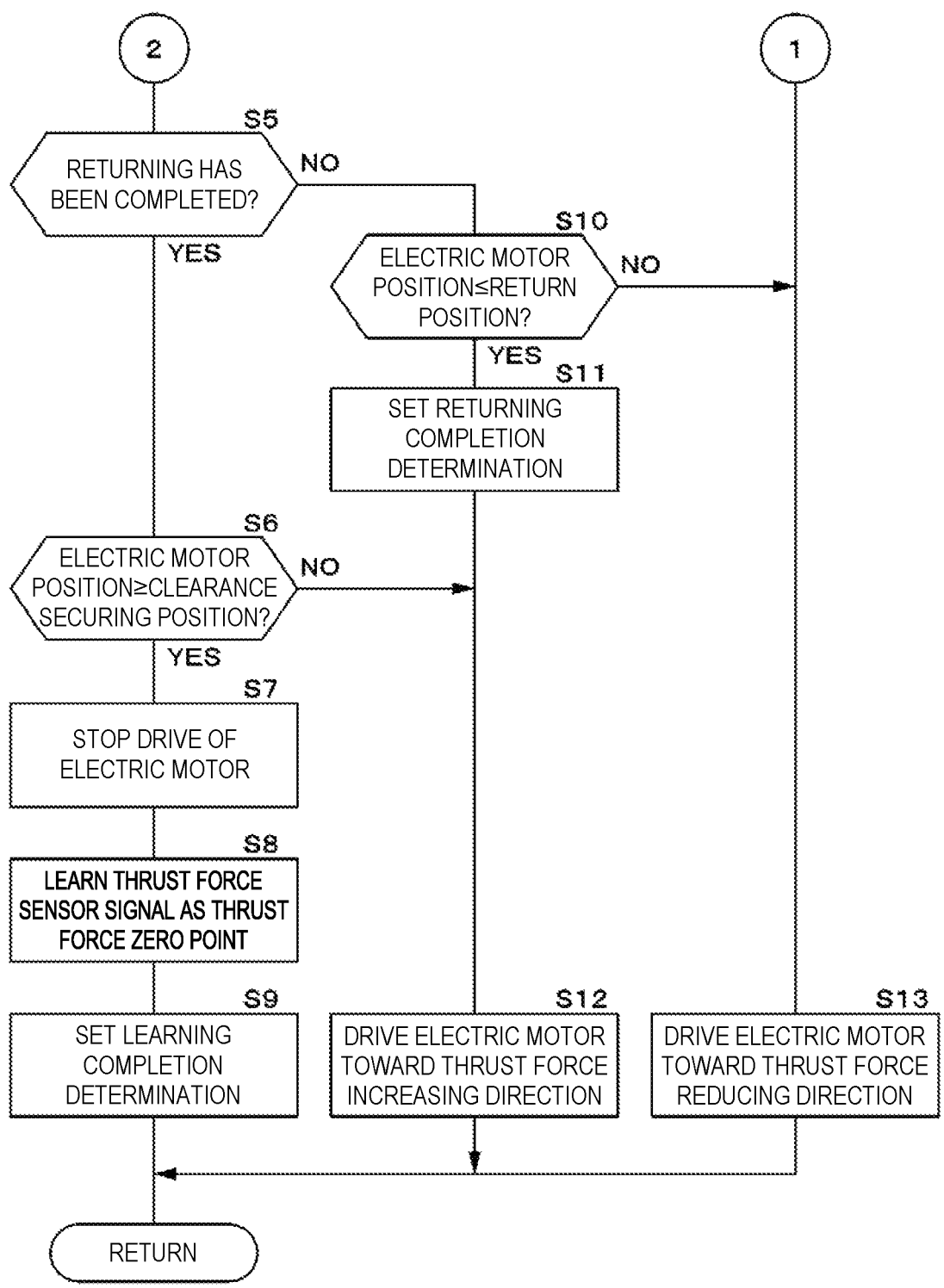
FIG. 6 is a flowchart following FIG. 5.

The present invention has been made in view of the above-mentioned problem. With reference to FIG. 4 to FIG. 6, description is now given of a first embodiment of the present invention.

FIG. 4 shows waveforms in time series for showing the operation of the electric brake 20 at the time when the first embodiment is implemented. In FIG. 4, there are shown a thrust force command, a thrust force, the sensor signal, and the position of the electric motor 39. The thrust force command is transmitted from the main ECU 9 to the ECU 11 for rear electric brake. The thrust force is achieved by the electric brake 20 as a result of the control based on the transmitted thrust force command. The sensor signal indicates the thrust force achieved by the control, and is detected by the thrust force sensor 44. The electric motor position is a result of the integration of the rotational angles of the electric motor 39 detected by the rotational angle sensor 46. It is assumed that when the electric motor position is displaced toward a positive direction, the thrust force increases, and the piston position can be estimated based on the reduction ratio achieved by the spur gear multistage speed reduction mechanism 35 and the planetary gear speed reduction mechanism 36 and a conversion coefficient between the displacement in rotational angle and the linear displacement of the ball screw mechanism 41.

It is preferred that the learning of the thrust force sensor signal when the thrust force is zero be executed when the thrust force command is 0. When the thrust force command becomes 0 at a time (a) of FIG. 4, the electric motor 39 is driven toward the thrust force reducing direction in order to reduce the drag torque as described above, to thereby further form the clearance from the position at which the thrust force becomes 0. In this configuration, a thrust force zero position P0, which is a position at which the thrust force is 0, is estimated or detected by known means based on the detection signal of the thrust force detected by the thrust force sensor 44, the detection signal of the rotational angle sensor 46, and the like at the time when the thrust force increases or decreases. Moreover, it is assumed that a clearance amount $\Delta Pa$ to be secured beyond the thrust force zero position P0 may be specified as a constant value based on, for example, an estimation precision of the thrust force zero position P0, mechanical design values and characteristics of the electric brake 20, and the like, or may be specified as a variable value calculated by known means from the change in the thrust force sensor signal and the like.

After the time (a) of FIG. 4, the electric motor 39 is driven to a clearance securing position P1 calculated by subtracting the clearance amount $\Delta Pa$ from the thrust force zero position P0 set as described above. The electric motor position reaches the clearance securing position P1 at a time (b). In the related art, the electric motor 39 is stopped at the clearance securing position P1, and waits until the thrust force command becomes non-zero for the next time. Meanwhile, in this embodiment, the electric motor 39 is further driven toward the thrust force reducing direction from the clearance securing position P1 by a return amount $\Delta Pb$. At a time (c), the electric motor position reaches a return position P2 obtained by further subtracting the return amount $\Delta Pb$ from the clearance securing position P1. After that, the electric motor 39 is driven toward the thrust force increasing direction so as to again reach the clearance securing position P1 at a time (d). At the time (d), the thrust force sensor signal is leaned as the value at the time when the thrust force is zero, and is used for the thrust force control when the thrust force command becomes non-zero for the next time. The load on the thrust force sensor 44 is changed by the operation for securing the clearance from the time (a) to the time (b) as described above. Meanwhile, the load on the thrust force sensor 44 can be changed, by the operation from the time (b) to the time (d), to the load exhibited in the state in which the piston 32 operates toward the thrust force increasing side. As a result, the thrust force sensor signal at the time when the thrust force is zero can precisely be learned.

Description is now given of setting of the return amount $\Delta Pb$ in the operation from the time (b) to the time (c) when the electric motor 39 is further operated so that the electric motor position moves from the clearance securing position P1 toward the thrust force reducing direction. The return amount $\Delta Pb$ is only required to be such a value that the change in load generated by the backlash of the mechanical components described above and the like is completed by the time the electric motor position reaches from the return position P2 to the clearance securing position P1 by the operation from the time (c) to the time (d). As a result, the return amount $\Delta Pb$ may be a fixed value calculated in advance from design values and tolerance of the mechanism and the like, or may be a variable value calculated from the change in thrust force sensor signal and the like.

FIG. 5 and FIG. 6 are flowcharts of a processing program for learning the thrust force zero point to be implemented by the ECU 11 for rear electric brake in order to achieve the above-mentioned operation. The program illustrated in FIG. 5 and FIG. 6 is repeated at predetermined cycles after, for example, an ignition switch is operated to ON. Moreover, notation "S" is used for a step of the flowcharts illustrated in FIG. 5 and FIG. 6, and, for example, Step 1 is thus denoted by "S1."

First in Step S1, the program determines whether or not the thrust force command is 0. A reason for the determination is that it is desired that the learning of the thrust force sensor signal at the time when the thrust force is zero in this embodiment be executed under the state in which the thrust force command is 0. Moreover, another reason is that when the thrust force command becomes non-zero, the operation in this embodiment is to be quickly stopped, and the thrust force command specified in Step S15 is to be achieved.

Thus, when the thrust force command is other than 0, the program makes a determination of "NO" in Step S1, and executes processing of Step S14 and Step S15. In this case, processing of Step S14 is processing for executing the learning operation from the beginning when the thrust force command becomes 0 again regardless of a completion state of the learning operation. Consequently, in Step S14, the program resets a "learning completion determination," and resets a "returning completion determination." Moreover, in Step S15, the program drives the electric motor 39 in accordance with the thrust force command, to thereby control the thrust force.

Meanwhile, when the thrust force command is 0, the program makes a determination of "YES" in Step S1, and proceeds to Step S2. In Step S2, the program determines whether or not the electric motor position has reached the clearance securing position P1, that is, whether or not the electric motor position is equal to or smaller than the clearance securing position P1. When the electric motor position is on a side toward the thrust force increasing direction with respect to the clearance securing position P1, and the electric motor position has thus not reached the clearance securing position P1, the program makes a determination of "NO" in Step S2, and proceeds to Step S13. In Step S13, the program continues the drive of the electric motor 39 toward the thrust force reducing direction. When the electric motor position becomes equal to or smaller than the clearance securing position P1, the program makes a determination of "YES" in Step S2, and proceeds to Step S3. In Step S3, the program determines whether or not the thrust force zero point has been learned, that is, whether or not the "learning completion determination" is set. When the learning of the thrust force zero point has been completed, the program makes a determination of "YES" in Step S3, and proceeds to Step S4. In Step S4, the program stops the drive of the electric motor 39 so as to maintain the position at which the electric motor position becomes equal to or smaller than the clearance securing position P1.

Meanwhile, when the "learning completion determination" is not set (is reset), the learning of the thrust force zero point has not been completed. Thus, the program makes a determination of "NO" in Step S3, and proceeds to Step S5. In Step S5, the program determines whether or not the "returning completion determination" is set. When the "returning completion determination" is not set (is reset), the program makes a determination of "NO" in Step S5, and proceeds to Step S10. In Step S10, the program determines whether or not the electric motor position is equal to or smaller than the return position P2. In this case, the return position P2 is the position obtained by subtracting the return amount ΔPb from the clearance securing position P1, and is the position away from the clearance securing position P1 toward the thrust force reducing direction by the return amount ΔPb.

When the electric motor position is on the side toward the thrust force increasing direction with respect to the return position P2, the program makes a determination of "NO" in Step S10, and proceeds to Step S13. In Step S13, the program causes the electric motor 39 to drive toward the thrust force reducing direction. As a result, as described with reference to FIG. 4, the drive toward the thrust force reducing direction is continued. The drive toward the thrust force reducing direction continues until the electric motor position becomes equal to or smaller than the return position P2 and the determination in Step S10 thus becomes "YES."

Meanwhile, when the electric motor position becomes equal to or smaller than the return position P2, the program makes a determination of "YES" in Step S10, and proceeds to Step S11. In Step S11, the program sets the "returning completion determination" indicating that the return operation has been completed. After that, in Step S12, the program causes the electric motor 39 to drive toward the thrust force increasing direction. When the electric motor position consequently reaches the return position P2, the electric motor 39 is switched from the drive toward the thrust force reducing direction to the drive toward the thrust force increasing direction.

After the operation of the electric motor 39 is switched, the "returning completion determination" is set in Step S11, and the program thus makes a determination of "YES" in Step S5, and proceeds to Step S6. In Step S6, the program determines whether or not the electric motor position has reached the clearance securing position P1 from the return position P2, that is, whether or not the electric motor position is equal to or larger than the clearance securing position P1. When the electric motor position is on a side toward the thrust force reducing direction with respect to the clearance securing position P1, the program makes a determination of "NO" in Step S6, and proceeds to Step S12. In Step S12, the program causes the electric motor 39 to drive toward the thrust force increasing direction. As a result, the electric motor 39 continues the drive toward the thrust force increasing direction until the electric motor position becomes equal to or larger than the clearance securing position P1.

Meanwhile, when the electric motor position is equal to or larger than the clearance securing position P1, the program makes a determination of "YES" in Step S6, and executes processing of Step S7 to Step S9. In Step S7, the program stops the drive of the electric motor 39. In Step S8, the program learns the thrust force sensor signal at this time point as the thrust force zero point. In Step S9, the program sets the "learning completion determination" indicating that the learning has been completed. After that, the program waits until the thrust force command becomes non-zero in Step S4. When the processing of any one of Step S4, Step S9, Step S12, Step S13, and Step S15 is finished, the program returns.

The program determines whether or not the electric motor position is equal to or smaller than the clearance securing position P1 in Step S2, and determines whether or not the electric motor position is equal to or larger than the clearance securing position P1 in Step S6. In those determinations, it is not required to determine whether or not the electric motor position strictly matches the clearance securing position P1. It is desired that a hysteresis width be set so that the determination does not present hunting due to a control deviation occurring in position control achieved by a publicly-known technology, noise of the rotation angle sensor 46, or the like, and the required clearance can be secured. Moreover, also in the learning of the thrust force zero point in Step S8, it is desired that not the value immediately after the motor drive is stopped be learned, but a value to which filtering processing, for example, averaging, has been applied be used as the value to be learned.

Moreover, in this embodiment, immediately after the thrust force command becomes 0 and then the clearance is secured, the return operation and the learning are executed, but the learning may be executed when a period of time has elapsed after the clearance was secured. As a result, the return operation and the learning may be executed when it is estimated that a period of time can be secured to complete the learning operation until the thrust force command becomes non-zero the next time, for example, when there occurs an event such as release of a brake pedal or depression of the accelerator pedal.

As described above, in the first embodiment, the ECU 11 (control device) for rear electric brake learns, as the reference point (zero point) of the piston thrust force, the detection value obtained by the thrust force sensor 44 (thrust force detection unit) when the electric motor 39 is driven to move the piston 32 in the direction for pressing the piston 32 against the disc rotor D in the range in which brake pads 22 and 23 are not in contact with the disc rotor D. As a result, it is possible to eliminate the fluctuation of the value of the thrust force sensor signal depending on the moving direction of the piston 32. In addition, the zero point is learned in the range in which the brake pads 22 and 23 are not in contact with the disc rotor D, and the zero point can thus be leaned under the state in which the thrust force is not generated.

Moreover, the ECU 11 for rear electric brake moves the piston 32 toward the direction away from the disc rotor D, and then moves the piston 32 toward the direction for pressing the piston 32 against the disc rotor D. As a result, the zero point of the piston thrust force can be learned after the piston 32 has been moved toward the direction for pressing the piston 32 against the disc rotor D, and it is thus possible to eliminate the fluctuation of the value of the thrust force sensor signal depending on the moving direction of the piston 32.

Moreover, the ECU 11 for rear electric brake moves the piston 32 toward the direction for pressing the disc rotor D until the detection value of the thrust force sensor 44 becomes a substantially constant value. Specifically, the ECU 11 for rear electric brake determines that the detection value of the thrust force sensor 44 becomes a substantially constant value based on the increase in electric motor position by the return amount ΔPb. Consequently, the thrust force zero point can be learned under a settled state in which the thrust force sensor signal does not temporally fluctuate. As a result, the thrust force zero point is not learned under an unsettled state in which the thrust force sensor signal temporally fluctuates, and it is thus possible to suppress learning of an incorrect zero point.

Further, the ECU 11 for rear electric brake moves the piston 32, toward the direction for pressing the disc rotor D, to the position at which the clearance between each of the brake pads 22 and 23 and the disc rotor D is the predetermined amount. That is, the ECU 11 for rear electric brake causes the electric motor 39 to drive toward the thrust force increasing direction until the electric motor position reaches the clearance securing position P1. As a result, it is possible to secure the clearance in the predetermined amount between the disc rotor D and each of the brake pads 22 and 23, and it is thus possible to learn the zero point in the range in which the brake pads 22 and 23 are not in contact with the disc rotor D.

FIG. 7 to FIG. 11 show a second embodiment of the present invention. A feature of the second embodiment is a configuration for learning the zero point again when a defined period has elapsed since the learning was completed or when the value of the thrust force sensor has fluctuated even when the same position is maintained. In the second embodiment, the same components as those of the first embodiment are denoted by the same reference symbols and numerals, and description thereof is omitted.

Figure 7:
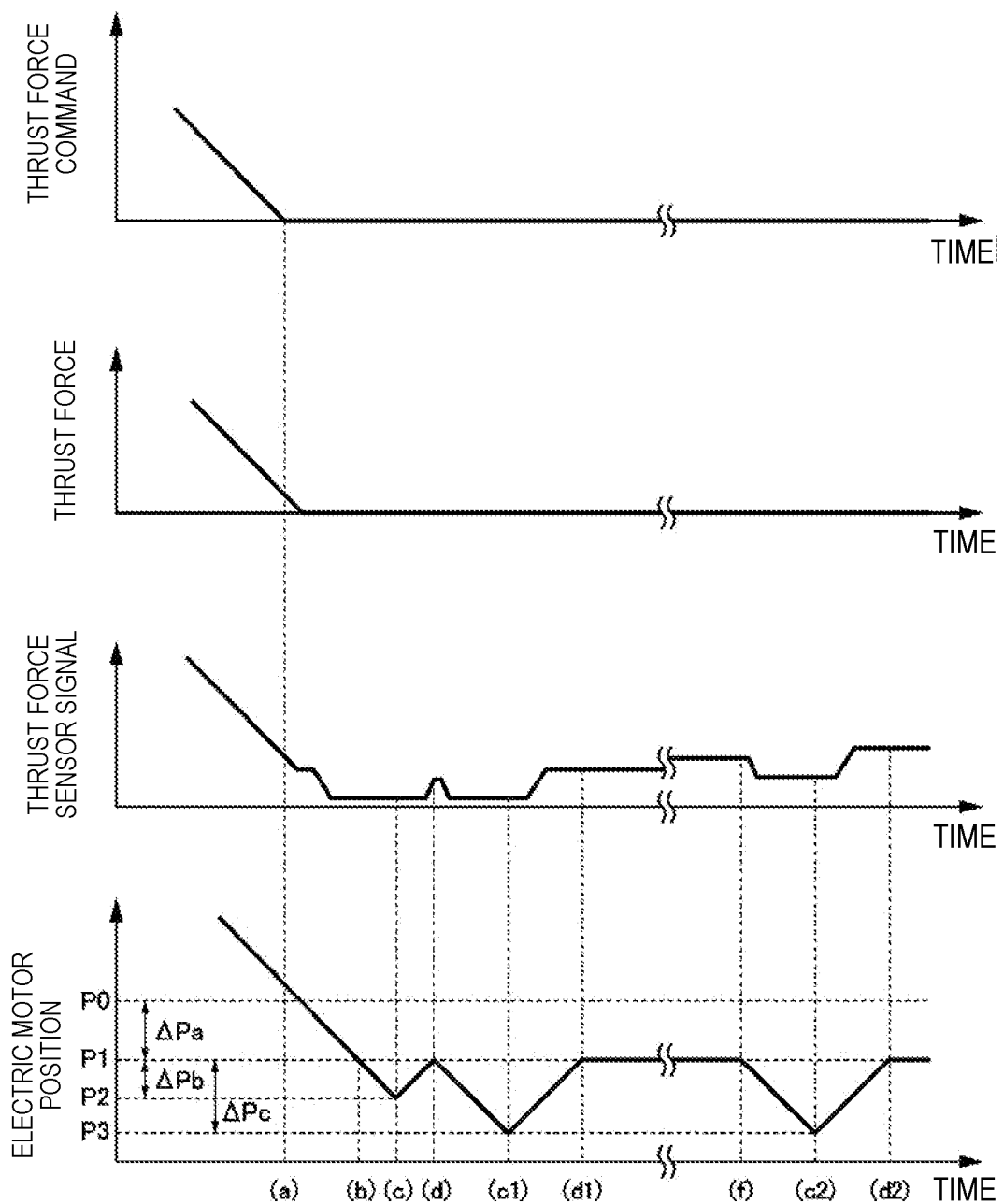
FIG. 7 shows characteristic graphs for showing an example of temporal changes in thrust force command, thrust force, thrust force sensor signal, and electric motor position in the second embodiment.

FIG. 7 shows waveforms in time series for showing the operation of the electric brake 20 at the time when the second embodiment is implemented. In FIG. 7, there are shown the thrust force command, the thrust force, the sensor signal, and the position of the electric motor 39. The thrust force command is transmitted from the main ECU 9 to the ECU 11 for rear electric brake. The thrust force is achieved by the electric brake 20 as a result of the control based on the transmitted thrust force command. The sensor signal indicates the thrust force achieved by the control, and is detected by the thrust force sensor 44. The electric motor position is a result of the integration of the rotational angles of the electric motor 39 detected by the rotational angle sensor 46.

An operation from the time (a) to the time (d) of FIG. 7 is the same as that from the time (a) to the time (d) of FIG. 4. In the second embodiment, after the time (d) of FIG. 7 is reached, the program determines whether or not the thrust force sensor signal has settled (determination for settling of the thrust force sensor signal). The state in which the thrust force sensor signal does not temporally fluctuate is the settled state. The state in which the thrust force sensor signal temporally fluctuates is the unsettled state. When the thrust force sensor signal has not settled at the time (d), the return amount ΔPb for the previous time is increased to a return amount ΔPc. As a result, as shown in a period from a time (c1) to a time (d1) of FIG. 7, after the electric motor 39 is driven toward the thrust force reducing direction to a return position P3 corresponding to the increased return amount ΔPc, the electric motor 39 is driven toward the thrust force increasing direction to the clearance securing position P1. In this state, the settling determination for the thrust force sensor signal is made again. After the thrust force sensor signal reaches the settled state, the thrust force zero point is learned.

In addition, when a defined period determined in advance has elapsed since the learning of the thrust force zero point was completed (a time (f) of FIG. 7), after the electric motor 39 is driven toward the thrust force reducing direction to the return position P3 corresponding to the increased return amount ΔPc, the electric motor 39 is driven toward the thrust force increasing direction to the clearance securing position P1 as shown in a period from a time (c2) to a time (d2). In this state, the settling determination for the thrust force sensor signal is made again. After the thrust force sensor signal reaches the settled state, the thrust force zero point is learned.

Figure 8:
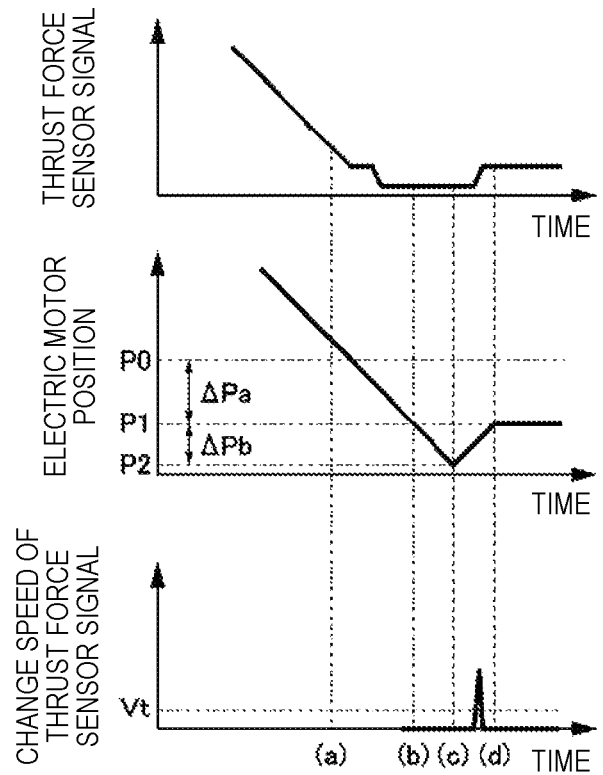
FIG. 8 shows characteristic graphs for showing an example of temporal changes in thrust force sensor signal, electric motor position, and change speed of the thrust force sensor signal at the time when the thrust force sensor signal settles at a time (d).
Figure 9:
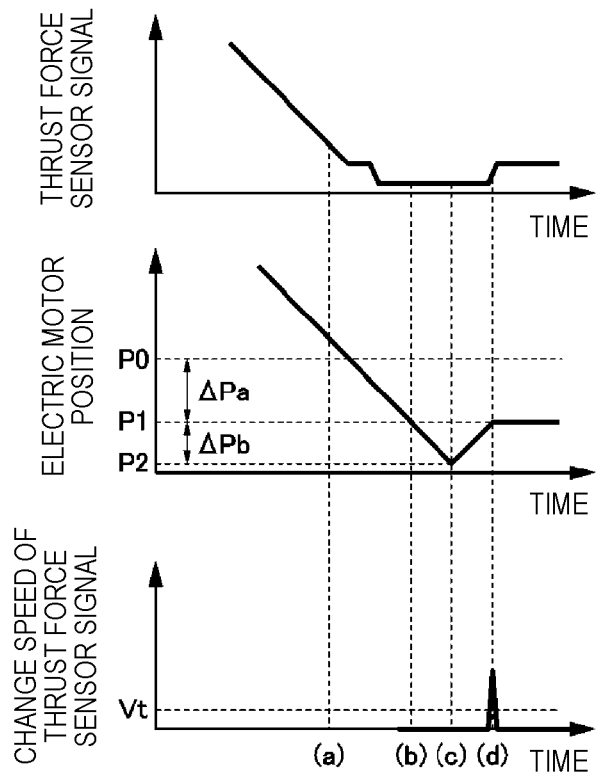
FIG. 9 shows characteristic graphs for showing an example of temporal changes in thrust force sensor signal, electric motor position, and change speed of the thrust force sensor signal at the time when the thrust force sensor signal does not settle at the time (d).

With reference to, for example, waveforms in time series of FIG. 8 and FIG. 9, description is now given of the determination of whether or not the thrust force sensor signal has settled (settling determination for the thrust force sensor signal). FIG. 8 and FIG. 9 are graphs for showing, in addition to the waveforms in time series of the sensor output signal and the electric motor position in the period from the time (a) to the time (d) of FIG. 7, a change speed of the sensor output signal at the same time points. The change speeds of FIG. 8 and FIG. 9 are different from each other.

Specifically, in FIG. 8, there is shown a case in which the load imposed on the thrust force sensor 44 changes in response to the drive of the electric motor 39 toward the thrust force increasing direction in the period from the time (c) to the time (d), and the thrust force sensor signal then settles. Meanwhile, in FIG. 9, there is shown a case in which the thrust force sensor signal has not settled. When the change speeds of the thrust force sensor signal are compared with each other, the change speed of the thrust force sensor signal at the time (d) is lower in the case of the settled thrust force sensor signal of FIG. 8. In the case of unsettled thrust force sensor signal of FIG. 9, the change speed of the thrust force sensor signal at the time (d) is higher. Thus, the determination of whether or not the thrust force sensor signal has settled can be made by providing a threshold value Vt for the change speed of the thrust force sensor signal. It is only required that the threshold value Vt be set based on design values in consideration of resolution, update cycles, a noise level of the thrust force sensor signal, and the like, and experimental values and the like. The above-mentioned settling determination is an example, and a width of the change, an acceleration of the change, and the like of the output signal may be used. Moreover, the settling determination is not required to be made based on the change in thrust force sensor signal with respect to the temporal change, but may be made based on a change in thrust force sensor signal with respect to a positional change of the electric motor 39.

Figure 10:
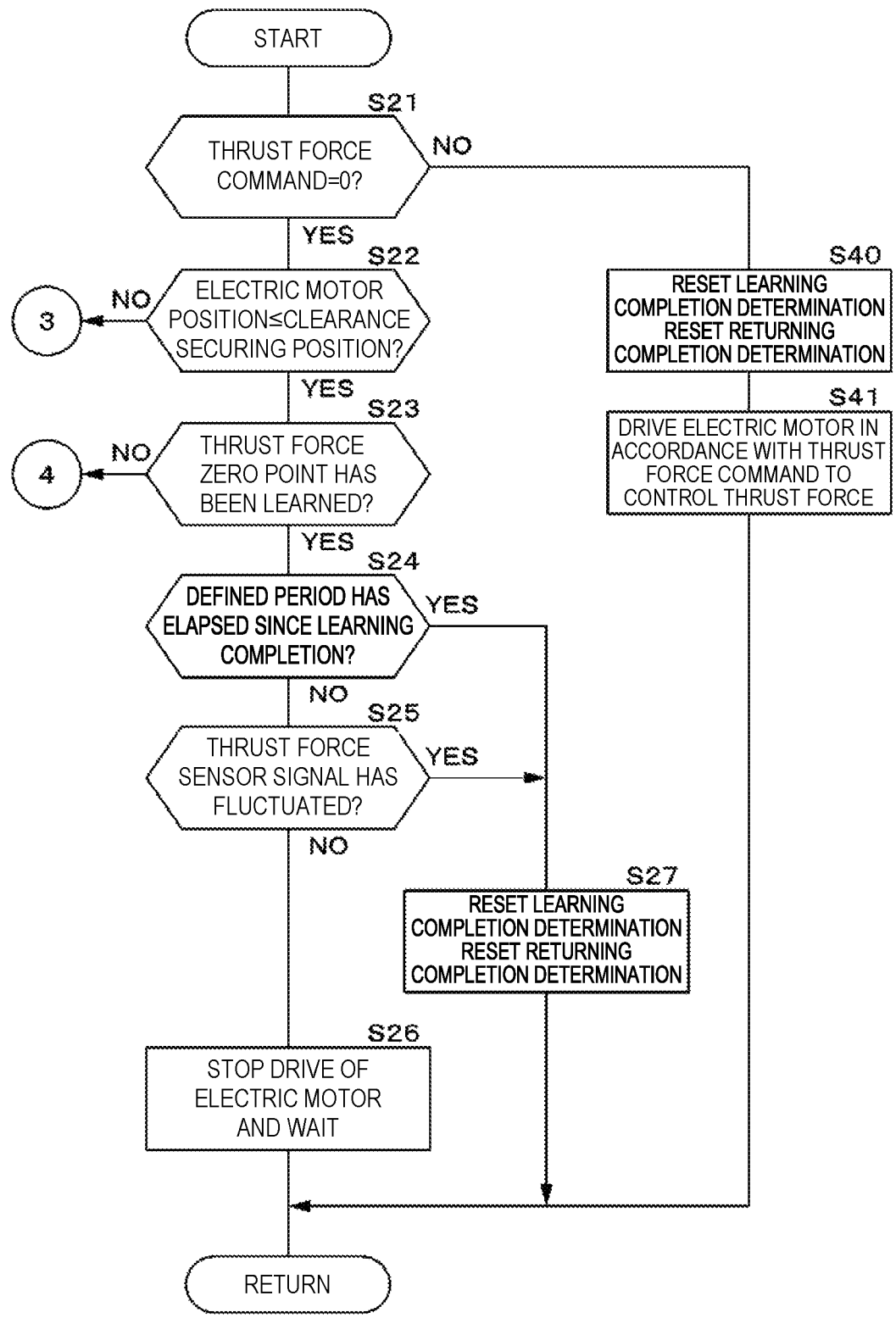
FIG. 10 is a flowchart for illustrating processing for learning the thrust force zero point in the second embodiment.
Figure 11:
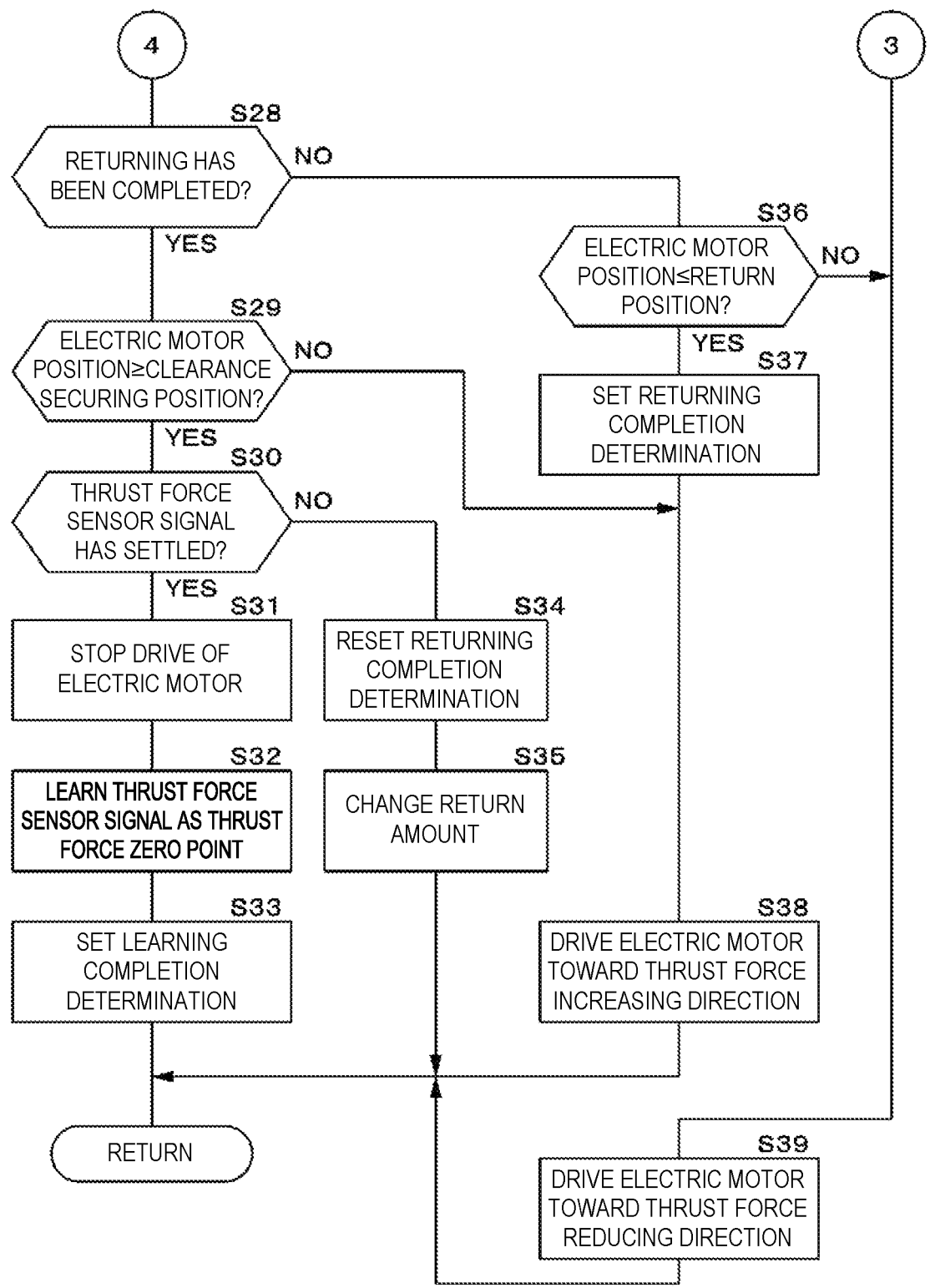
FIG. 11 is a flowchart following FIG. 10.

FIG. 10 and FIG. 11 are flowcharts of a processing program for learning the thrust force zero point to be implemented by the ECU 11 for rear electric brake in order to achieve the above-mentioned operation. The program illustrated in FIG. 10 and FIG. 11 is repeated at predetermined cycles after, for example, the ignition switch is operated to ON. Moreover, notation "S" is used for a step of the flowcharts illustrated in FIG. 10 and FIG. 11, and, for example, Step 21 is thus denoted by "S21."

First in Step S21, the program determines whether or not the thrust force command is 0. Thus, when the thrust force command is other than 0, the program makes a determination of "NO" in Step S21, and executes processing of Step S40 and Step S41. Consequently, in Step S40, the program resets a "learning completion determination," and resets a "returning completion determination." Moreover, in Step S41, the program drives the electric motor 39 in accordance with the thrust force command, to thereby control the thrust force.

Meanwhile, when the thrust force command is 0, the program makes a determination of "YES" in Step S21, and proceeds to Step S22. In Step S22, the program determines whether or not the electric motor position has reached the clearance securing position P1, that is, whether or not the electric motor position is equal to or smaller than the clearance securing position P1. When the electric motor position is on the side toward the thrust force increasing direction with respect to the clearance securing position P1, and the electric motor position has thus not reached the clearance securing position P1, the program makes a determination of "NO" in Step S22, and proceeds to Step S39. In Step S39, the program continues the drive of the electric motor 39 toward the thrust force reducing direction. When the electric motor position becomes equal to or smaller than the clearance securing position P1, the program makes a determination of "YES" in Step S22, and proceeds to Step S23. In Step S23, the program determines whether or not the thrust force zero point has been learned, that is, whether or not the "learning completion determination" is set. When the learning of the thrust force zero point has been completed, the program makes a determination of "YES" in Step S23, and proceeds to Step S24.

In Step S24, the program determines whether or not the defined period determined in advance has elapsed since the learning was finished. When the defined period has elapsed, the program makes a determination of "YES" in Step S24, and proceeds to Step S27. In Step S27, the program resets the "learning completion determination," and resets the "returning completion determination." When the defined period has not elapsed, the program makes a determination of "NO" in Step S24, and proceeds to Step S25.

In Step S25, the program determines whether or not the value of the thrust force sensor has fluctuated even when the same position of the electric motor is maintained. When the thrust force sensor signal has fluctuated, the program makes a determination of "YES" in Step S25, and proceeds to Step S27. In Step S27, the program resets the "learning completion determination," and resets the "returning completion determination." When the thrust force sensor signal has not fluctuated, the program makes a determination of "NO" in Step S25, and proceeds to Step S26. In Step S26, the program stops the drive of the electric motor 39 so as to maintain the position at which the electric motor position becomes equal to or smaller than the clearance securing position P1.

Meanwhile, when the "learning completion determination" is not set (is reset), the learning of the thrust force zero point has not been completed, the program makes a determination of "NO" in Step S23, and proceeds to Step S28. In Step S28, the program determines whether or not the "returning completion determination" is set. When the "returning completion determination" is not set (is reset), the program makes a determination of "NO" in Step S28, and proceeds to Step S36. In Step S36, the program determines whether or not the electric motor position is equal to or smaller than the return position P2 or P3. In this case, the return positions P2 and P3 are determined in accordance with the current return amounts $\Delta Pb$ and $\Delta Pc$, respectively. That is, the return amount is $\Delta Pb$ in the initial state, and the electric motor position and the return position P2 are thus compared with each other. Meanwhile, after the return amount is increased to $\Delta Pc$ in Step S35, the electric motor position and the return position P3 are compared with each other. When the electric motor position is on a side toward the thrust force increasing direction with respect to the return position P2 or P3, the program makes a determination of "NO" in Step S36, and proceeds to Step S39. In Step S39, the program causes the electric motor 39 to drive toward the thrust force reducing direction.

When the electric motor position becomes equal to or smaller than the return position P2 or P3, the program makes a determination of "YES" in Step S36, and proceeds to Step S37. In Step S37, the program sets the "returning completion determination" indicating that the return operation has been completed. After that, in Step S38, the program causes the electric motor 39 to drive toward the thrust force increasing direction. When the electric motor position consequently reaches the return position P2, the electric motor 39 is switched from the drive toward the thrust force reducing direction to the drive toward the thrust force increasing direction.

When the "returning completion determination" is set, the program makes a determination of "YES" in Step S28, and proceeds to Step S29. In Step S29, the program determines whether or not the electric motor position has increased so that the electric motor position has reached the clearance securing position P1, that is, whether or not the electric motor position is equal to or larger than the clearance securing position P1. When the electric motor position is on the side toward the thrust force reducing direction with respect to the clearance securing position P1, the program makes a determination of "NO" in Step S29, and proceeds to Step S38. In Step S38, the program causes the electric motor 39 to drive toward the thrust force increasing direction. As a result, the electric motor 39 continues the drive toward the thrust force increasing direction until the electric motor position becomes equal to or larger than the clearance securing position P1.

Meanwhile, when the electric motor position is equal to or larger than the clearance securing position P1, the program makes a determination of "YES" in Step S29, and proceeds to Step S30. In Step S30, the program determines whether or not the thrust force sensor signal has settled. When the thrust force sensor signal has settled, the program makes a determination of "YES" in Step S30, and executes processing of Step S31 to Step S33. In Step S31, the program stops the drive of the electric motor 39. In Step S32, the program learns the thrust force sensor signal at this time point as the thrust force zero point. In Step S33, the program sets the "learning completion determination" indicating that the learning has been completed. After that, the program waits until the thrust force command becomes non-zero in Step S4.

When the thrust force sensor signal has not settled, the program makes a determination of "NO" in Step S30, and executes processing of Step S34 and Step S35. In Step S34, the program resets the "returning completion determination." In Step S35, the program changes the return amount. That is, the program changes the return amount $\Delta Pb$, which is the initial value, to the return amount $\Delta Pc$ larger than the return amount $\Delta Pb$. When the processing of any one of Step S26, Step S27, Step S33, Step S35, Step S38, Step S39, and Step S41 is finished, the program returns.

As described above, when the program determines whether or not the thrust force sensor signal has settled, and makes the determination of "YES" in Step S30, the program executes the processing of Step S31 to Step S33, to thereby learn the thrust force zero point. Meanwhile, when the program makes the determination of "NO" in Step S30, the program determines that the return amount ΔPb is insufficient, and resets the "returning completion determination" in Step S34. Then, in Step S35, the program increases the return amount so as to be larger than ΔPb for the previous time. As a result, as shown in the period from the time (c1) to the time (d1), the program executes the motor drive toward the thrust force reducing direction to the return position P3 corresponding to the increased return amount ΔPc and the subsequent motor drive toward the thrust force increasing direction to the clearance securing position P1, and makes again the settling determination for the thrust force sensor signal in Step S30. It is only required that an increase amount for increasing the return amount ΔPb to the return amount ΔPc be set in advance. It is desired that the return amount ΔPc be set to a value equal to or larger than the initial return amount ΔPb (ΔPc≥ΔPb). The temporarily increased return amount ΔPc may be reset to the initial return amount ΔPb, for example, when the program is restarted by the operation on the ignition switch. In Step S27, the program may reset the return amount ΔPc to the initial return amount ΔPb. In Step S30, the program may reset the return amount ΔPc to the initial return amount ΔPb after a predetermined period of time has elapsed since the settling was determined in Step S30.

As described above, also in the second embodiment, there can be provided an action and an effect which are substantially the same as those in the first embodiment. Moreover, in the second embodiment, when the defined period has elapsed since the learning was completed or when the value of the thrust force sensor has fluctuated even when the same position is maintained, both of the "leaning completion determination" and the "returning completion determination" are reset so that the zero point is allowed to be learned again. As a result, when the learning has not been executed for a long period of time, and the thrust force sensor signal has thus fluctuated due to the temperature change or the like, the zero point can precisely be learned.

Moreover, in the second embodiment, the ECU 11 for rear electric brake moves the piston 32 toward the direction for pressing the disc rotor D until the detection value of the thrust force sensor 44 becomes a substantially constant value. Consequently, the thrust force zero point can be learned under the settled state in which the thrust force sensor signal does not temporally fluctuate. As a result, the thrust force zero point is not learned under the unsettled state in which the thrust force sensor signal temporally fluctuates, and it is thus possible to suppress the learning of an incorrect zero point.

Figure 12:
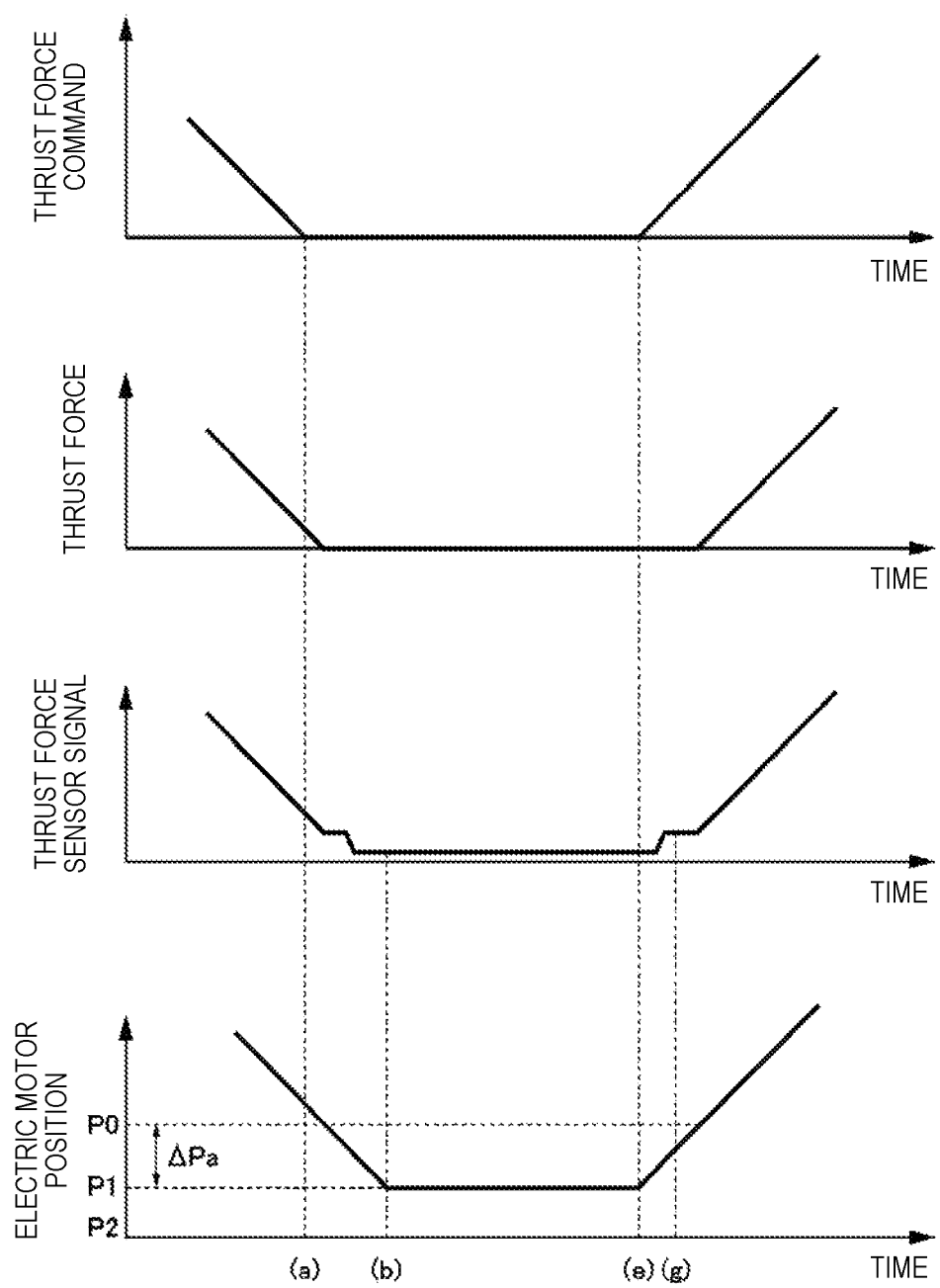
FIG. 12 shows characteristic graphs for showing an example of temporal changes in thrust force command, thrust force, thrust force sensor signal, and electric motor position in the third embodiment.
Figure 13:
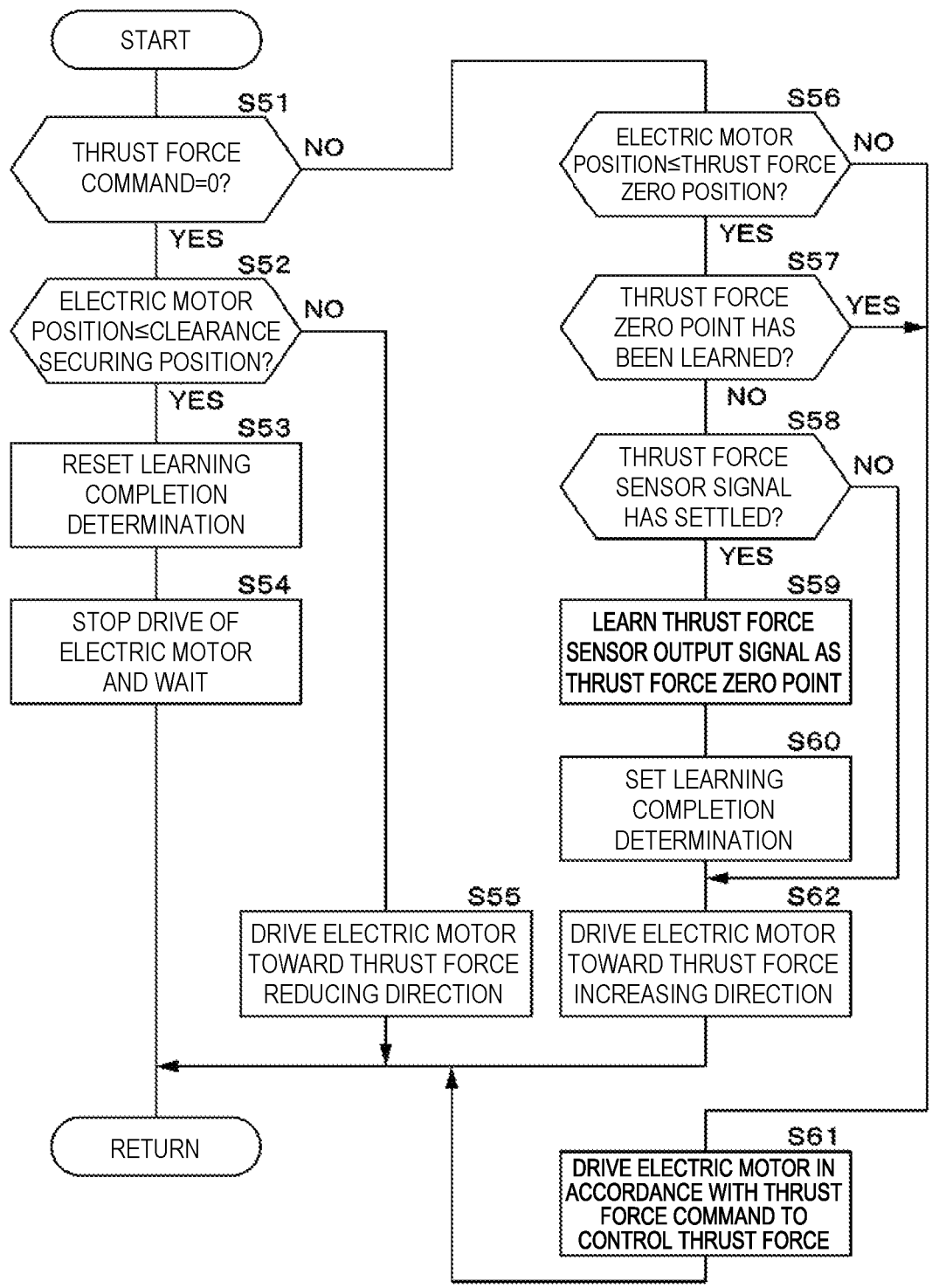
FIG. 13 is a flowchart for illustrating processing for learning the thrust force zero point in the third embodiment.

FIG. 12 and FIG. 13 show a third embodiment of the present invention. A feature of the third embodiment is such a configuration that the zero point is learned while the electric motor is driving toward the thrust force increasing direction after the thrust force command becomes non-zero. In the third embodiment, the same components as those of the first embodiment are denoted by the same reference symbols, and description thereof is omitted.

FIG. 12 shows waveforms in time series for showing the operation of the electric brake 20 at the time when the third embodiment is implemented. In FIG. 12, there are shown the thrust force command, the thrust force, the sensor signal, and the position of the electric motor 39. The thrust force command is transmitted from the main ECU 9 to the ECU 11 for rear electric brake. The thrust force is achieved by the electric brake 20 as a result of the control based on the transmitted thrust force command. The sensor signal indicates the thrust force achieved by the control, and is detected by the thrust force sensor 44. The electric motor position is a result of the integration of the rotational angles of the electric motor 39 detected by the rotational angle sensor 46.

As shown in FIG. 12, after the thrust force command becomes 0 at the time (a), and the electric motor 39 is driven until the electric motor position reaches the clearance securing position P1 at the time (b), the program waits at the clearance securing position P1. After that, the thrust force command becomes non-zero at a time (e), and the program determines that a load change occurs to the thrust force sensor 44 at a time (g) while the electric motor 39 is driving toward the thrust force increasing direction, and learns the sensor signal as the zero point in this state.

FIG. 13 is a flowchart of a processing program for learning the thrust force zero point to be implemented by the ECU 11 for rear electric brake in order to achieve the above-mentioned operation. The program illustrated in FIG. 13 is repeated at predetermined cycles after, for example, the ignition switch is operated to ON. Moreover, notation "S" is used for a step of the flowchart illustrated in FIG. 13, and, for example, Step 51 is thus denoted by "S51."

First in Step S51, the program determines whether or not the thrust force command is 0. When the thrust force command is 0, the program makes a determination of "YES" in Step S51, and proceeds to Step S52. In Step S52, the program determines whether or not the electric motor position has reached the clearance securing position P1, that is, whether or not the electric motor position is equal to or smaller than the clearance securing position P1. When the electric motor position is on the side toward the thrust force increasing direction with respect to the clearance securing position P1, and the electric motor position has thus not reached the clearance securing position P1, the program makes a determination of "NO" in Step S52, and proceeds to Step S55. In Step S55, the program continues the drive of the electric motor 39 toward the thrust force reducing direction. When the electric motor position becomes equal to or smaller than the clearance securing position P1, the program makes a determination of "YES" in Step S52, and executes processing of Step S53 and Step S54. In Step S53, the program resets the "learning completion determination." In Step S54, the program stops the drive of the electric motor 39 so as to maintain the electric motor position equal to or smaller than the clearance securing position P1.

When the thrust force command is other than 0, the program makes a determination of "NO" in Step S51, and proceeds to Step S56. In Step S56, the program determines whether or not the electric motor position is equal to or smaller than the thrust force zero position P0. When the electric motor position is on a side toward the thrust force increasing direction with respect to the thrust force zero position P0, the program makes a determination of "NO" in Step S56, and proceeds to Step S61. In Step S61, the program drives the electric motor 39 in accordance with the thrust force command, to thereby control the thrust force.

When the electric motor position is equal to or smaller than the thrust force zero position P0, the program makes a determination of "YES" in Step S56, and proceeds to Step S57. In Step S57, the program determines whether or not the thrust force zero point has been learned, that is, whether or not the "learning completion determination" is set. When the learning of the thrust force zero point has been completed, the program makes a determination of "YES" in Step S57, and proceeds to Step S61. In Step S61, the program drives the electric motor 39 in accordance with the thrust force command, to thereby control the thrust force.

Meanwhile, when the "learning completion determination" is not set (is reset), the learning of the thrust force zero point has not been completed. Thus, the program makes a determination of "NO" in Step S57, and proceeds to Step S58. In Step S58, the program determines whether or not the thrust force sensor signal has settled. When the thrust force sensor signal has settled, the program makes a determination of "YES" in Step S58, and executes processing of Step S59 and Step S60. In Step S59, the program learns the thrust force sensor signal at this time point as the thrust force zero point. In Step S60, the program sets the "learning completion determination" indicating that the learning has been completed, and proceeds to Step S62 to drive the electric motor 39 toward the thrust force increasing direction.

When the thrust force sensor signal has not settled, the program makes a determination of "NO" in Step S58, and proceeds to Step S62 to drive the electric motor 39 toward the thrust force increasing direction, and returns. When the processing of any one of Step S54, Step S55, Step S61, and Step S62 is finished, the program returns.

As described above, after the thrust force command becomes 0, the operation of securing the clearance and then waiting is achieved by the processing of Step S51 to Step S55. When the thrust force command becomes non-zero, the program first determines that the position of the electric motor 39 is not equal to or larger than the thrust force zero position P0 in Step S56. When the program determines that the zero point of the thrust force sensor has not been learned in Step S57, the program executes the settling determination for the thrust force sensor signal in Step S58. The settling determination for the thrust force sensor signal is made in accordance with, for example, whether or not the change speed of the thrust force sensor signal has exceeded the threshold value Vt as in the second embodiment. The settling determination for the thrust force sensor signal is not limited to this mode, and may be made when the electric motor position has increased by the return amount ΔPb as in the first embodiment. When the electric motor position becomes equal to or larger than the thrust force zero position P0 before the settling determination is made, it is preferred that the thrust force control be executed without learning the zero point as in the case of the determination made in Step S56.

As described above, also in the third embodiment, there can be provided an action and an effect which are substantially the same as those in the first embodiment. Moreover, in the third embodiment, the zero point is learned while the electric motor is driving toward the thrust force increasing direction. Accordingly, it is not required to cause the electric motor 39 to drive toward the thrust force reducing direction beyond the clearance securing position P1, and the thrust force zero point can quickly be learned.

The first to third embodiments may be implemented independently of one another, but may be implemented in combination. The zero points learned in the respective embodiments may be used after averaging the zero points, for example.

Moreover, in the first to third embodiments, the completion of the operation of the electric motor 39 toward the thrust force reducing direction for securing the clearance and the completion of the learning operation through the operations of the electric motor 39 toward the thrust force reducing direction and the thrust force increasing direction are determined based on the electric motor position. However, the determination in the present invention is not limited to this mode, and the completion of the operation may be determined based on, for example, a drive period of the electric motor 39. In this case, the rotational angle sensor 46 is not required.

In each of the embodiments, the electric brakes 20 are applied to the rear wheels 5L and 5R, but the electric brakes 20 may be applied to the front wheels 3L and 3R, or the electric brakes 20 may be applied to all of the four wheels.

As the electric brake according to the above-mentioned embodiments, for example, the following aspects are conceivable.

As a first aspect, there is provided an electric brake including: a brake mechanism configured to transmit a thrust force generated through drive of an electric motor to a piston, the piston being configured to move brake pads to be pressed against a disc; a thrust force detection unit configured to detect the thrust force transmitted to the piston; and a control device configured to control the drive of the electric motor based on a detection value obtained by the thrust force detection unit, wherein the control device is configured to set, as a reference point (zero point) of a piston thrust force, the detection value obtained by the thrust force detection unit when the electric motor is driven to move the piston toward a direction for pressing the disc in a range in which the brake pads are not in contact with the disc.

As a second aspect, in the first aspect, the control device is configured to move the piston toward a direction away from the disc, and then to move the piston toward the direction for pressing the disc.

As a third aspect, in the first or second aspect, the control device is configured to move the piston toward the direction for pressing the disc until the detection value obtained by the thrust force detection unit becomes a substantially constant value.

As a fourth aspect, in any one of the first to third aspects, the control device is configured to move the piston toward the direction for pressing the disc to a position at which a clearance between the disc and the brake pads is a predetermined amount.

Moreover, as the control device according to the embodiments, for example, the following aspect is conceivable.

As a fifth aspect, there is provided a control device, the control device being configured to: control drive of an electric motor of a brake mechanism, the brake mechanism being configured to transmit a thrust force generated through the drive of the electric motor to a piston, the piston being configured to move brake pads to be pressed against a disc based on a detection value obtained by a thrust force detection unit, the thrust force detection unit being configured to detect the thrust force transmitted to the piston; and set, as a reference point (zero point) of a piston thrust force, the detection value obtained by the thrust force detection unit when the electric motor is driven to move the piston toward a direction for pressing the disc in a range in which the brake pads are not in contact with the disc.

Note that, the present invention is not limited to the above-mentioned embodiments, and includes further various modification examples. For example, in the above-mentioned embodiments, the configurations are described in detail in order to clearly describe the present invention, and the present invention is not necessarily limited to an embodiment that includes all the configurations that have been described. Further, a part of the configuration of a given embodiment can be replaced by the configuration of another embodiment, and the configuration of another embodiment can also be added to the configuration of a given embodiment. Further, another configuration can be added to, deleted from, or replace a part of the configuration of each of the embodiments.

The present application claims a priority based on Japanese Patent Application No. 2018-180339 filed on Sep. 26, 2018. All disclosed contents including Specification, Scope of Claims, Drawings, and Abstract of Japanese Patent Application No. 2018-180339 filed on Sep. 26, 2018 are incorporated herein by reference in their entirety.

REFERENCE SIGNS LIST 3L, 3R front wheel, 5L, 5R rear wheel, 11 ECU for rear electric brake (control device), 20 electric brake, 21 brake mechanism, 22 inner brake pad, 23 outer brake pad, 24 caliper, 32 piston, 35 spur gear multistage speed reduction mechanism, 36 planetary gear speed reduction mechanism, 37 carrier, 39 electric motor, 40 rotating shaft, 41 ball screw mechanism, 44 thrust force sensor (thrust force detection unit), 45 return mechanism (fail open mechanism), 46 rotational angle sensor, 47 thrust force holding mechanism, 48 return spring, 49 current sensor

The invention claimed is:

1. An electric brake, comprising:
a brake mechanism configured to transmit a thrust force generated through drive of an electric motor to a piston, the piston being configured to move brake pads to be pressed against a disc;
a thrust force detection unit configured to detect the thrust force transmitted to the piston; and
a control device configured to control the drive of the electric motor based on a detection value obtained by the thrust force detection unit,
wherein the control device is configured to set, as a reference point of a piston thrust force, a detection value obtained by the thrust force detection unit when the electric motor is driven to move the piston toward a direction for pressing the disc in a range in which the brake pads are not in contact with the disc.

2. The electric brake according to claim 1, wherein the control device is configured to move the piston toward a direction away from the disc, and then to move the piston toward the direction for pressing the disc.

3. The electric brake according to claim 1, wherein the control device is configured to move the piston toward the direction for pressing the disc until the detection value obtained by the thrust force detection unit becomes a substantially constant value.

4. The electric brake according to claim 1, wherein the control device is configured to move the piston toward the direction for pressing the disc to a position at which a clearance between the disc and the brake pads is a predetermined amount.

5. A control device, the control device being configured to:
control drive of an electric motor of a brake mechanism, the brake mechanism being configured to transmit a thrust force generated through the drive of the electric motor to a piston, the piston being configured to move brake pads to be pressed against a disc based on a detection value obtained by a thrust force detection unit, the thrust force detection unit being configured to detect the thrust force transmitted to the piston; and
set, as a reference point of a piston thrust force, a detection value obtained by the thrust force detection unit when the electric motor is driven to move the piston toward a direction for pressing the disc in a range in which the brake pads are not in contact with the disc.

* * * * *